(12) United States Patent
Xiao et al.

(10) Patent No.: US 11,962,541 B2
(45) Date of Patent: Apr. 16, 2024

(54) SECONDARY CELL CONTROL METHOD AND APPARATUS

(71) Applicant: HUAWEI TECHNOLOGIES CO., LTD., Shenzhen (CN)

(72) Inventors: Jiehua Xiao, Shenzhen (CN); Jinlin Peng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 543 days.

(21) Appl. No.: 17/172,087

(22) Filed: Feb. 10, 2021

(65) Prior Publication Data
US 2021/0167928 A1    Jun. 3, 2021

Related U.S. Application Data

(63) Continuation of application No. PCT/CN2019/099849, filed on Aug. 8, 2019.

(30) Foreign Application Priority Data

Aug. 10, 2018  (CN) .......................... 201810912127.9

(51) Int. Cl.
*H04L 5/00* (2006.01)
*H04L 1/1812* (2023.01)
(Continued)

(52) U.S. Cl.
CPC .......... *H04L 5/0078* (2013.01); *H04L 1/1812* (2013.01); *H04L 5/0057* (2013.01);
(Continued)

(58) Field of Classification Search
CPC ... H04L 5/0078; H04L 1/1812; H04L 5/0057; H04L 27/2605; H04L 5/0044;
(Continued)

(56) References Cited

U.S. PATENT DOCUMENTS 10,750,564 B2 *  8/2020  Zhou ..................... H04W 72/23
2018/0139030 A1  5/2018  Kim et al.
(Continued)

FOREIGN PATENT DOCUMENTS

CN    102958045 A    3/2013
CN    105589506 A    5/2016
(Continued)

OTHER PUBLICATIONS

Huawei, Hisilicon, Further discussion on Scell activation and deactivation delay, 3GPP TSG-RAN WG4 Meeting #86, Athens, Greece, Feb. 26-Mar. 2, 2018, R4-1802687, 5 pages.
(Continued)

*Primary Examiner* — Mohamed A Kamara
(74) *Attorney, Agent, or Firm* — Maier & Maier, PLLC

(57) ABSTRACT

This application provides a secondary cell control method and an apparatus. The method includes: A terminal device receives control information in a time unit n, where the control information may include an activation command for a first secondary cell or a deactivation command for a first secondary cell. When the control information includes the activation command for the first secondary cell, first information of the first secondary cell is sent in a time unit n+k, where k is determined based on a first frame structure parameter configured for the terminal device, and both n and k are positive integers. The first information may be a CSI report.

20 Claims, 10 Drawing Sheets

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

(51) Int. Cl.
*H04L 27/26* (2006.01)
*H04W 72/0446* (2023.01)
*H04W 72/20* (2023.01)

(52) U.S. Cl.
CPC ..... *H04L 27/2605* (2013.01); *H04W 72/0446* (2013.01); *H04W 72/20* (2023.01)

(58) Field of Classification Search
CPC ..... H04L 5/001; H04L 1/1854; H04L 5/0098; H04L 1/1896; H04W 72/0446; H04W 72/20; H04W 72/0453; H04W 24/10
See application file for complete search history.

(56) References Cited

U.S. PATENT DOCUMENTS

| | | | |
|---|---|---|---|
| 2019/0191404 A1* | 6/2019 | Tang | H04W 48/16 |
| 2021/0218502 A1* | 7/2021 | Park | H04W 72/0453 |
| 2021/0273771 A1* | 9/2021 | Takeda | H04L 27/2602 |
| 2021/0298052 A1* | 9/2021 | Namba | H04L 1/1851 |

FOREIGN PATENT DOCUMENTS

| | | |
|---|---|---|
| CN | 106031256 A | 10/2016 |
| CN | 106105333 A | 11/2016 |
| CN | 106576366 A | 4/2017 |
| KR | 1020160150138 A | 12/2016 |
| WO | 2012150499 A1 | 11/2012 |
| WO | 2015147720 A1 | 10/2015 |
| WO | 2018031704 A1 | 2/2018 |
| WO | 2018061293 A1 | 4/2018 |

OTHER PUBLICATIONS

Huawei et al. "Discussion on Scell activation/deactivation delay." 3GPP TSG-RAN WG4 Meeting #87, R4-1807341, Busan, Korea, May 21-25, 2018, 4 pages.

3GPP TS 36.213 V15.2.0 (Jun. 2018), "3rd Generation Partnership Project; Technical Specification Group Radio Access Network; Evolved Universal Terrestrial Radio Access (E-UTRA); Physical layer procedures(Release 15)." 541 pages.

Qualcomm Inc. "SCell Dormant State Transitions based on New Timers & MAC-CEs." 3GPP TSG-RAN2 Meeting #102, R2-1806924, Busan, S. Korea, May 21-25, 2018, 12 pages.

3GPP TS 36.321 V15.2.0 (Jul. 2018), 3rd Generation Partnership Project; Technical Specification Group Radio Access Network; Evolved Universal Terrestrial Radio Access (E-UTRA); Medium Access Control (MAC) protocol specification (Release 15), 126 pages.

Qualcomm Incorporated. "Summary of Remaining Details on RACH Procedure." 3GPP TSG-RAN WG1 93, R1-1807633, Busan, Korea, May 21-May 25, 2018, 22 pages.

3GPP TS 38.133 V15.2.0 (Jun. 2018), "3rd Generation Partnership Project; Technical Specification Group Radio Access Network; NR; Requirements for support of radio resource management(Release 15)." 79 pages.

3GPP TS 38.213 V15.2.0 (Jun. 2018). "3rd Generation Partnership Project; Technical Specification Group Radio Access Network; NR; Physical layer procedures for control (Release 15)." 99 pages.

3GPP TS 38.321 V15.2.0 (Jun. 2018). "3rd Generation Partnership Project; Technical Specification Group Radio Access Network; NR; Medium Access Control (MAC) protocol specification (Release 15)." 73 pages.

3GPP TS 38.331 V15.2.1 (Jun. 2018). "3rd Generation Partnership Project; Technical Specification Group Radio Access Network; NR; Radio Resource Control (RRC) protocol specification (Release 15)." 303 pages.

3GPP TS 38.211 V15.2.0 (Jun. 2018). "3rd Generation Partnership Project; Technical Specification Group Radio Access Network; NR; Physical channels and modulation (Release 15)." 96 pages.

3GPP TS 38.214 V15.2.0 (Jun. 2018). "3rd Generation Partnership Project; Technical Specification Group Radio Access Network; NR; Physical layer procedures for data (Release 15)." 95 pages.

Qualcomm Incorporated. "NR SCell activation timeline." 3GPP RAN4#86. Athens, Greece. Feb 26-Mar. 2, 2018. R4-1803037. 6 pages.

* cited by examiner

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

SECONDARY CELL CONTROL METHOD AND APPARATUS

CROSS-REFERENCE TO RELATED APPLICATIONS

This application is a continuation of International Application No. PCT/CN2019/099849, filed on Aug. 8, 2019, which claims priority to Chinese Patent Application No. 201810912127.9, filed on Aug. 10, 2018. The disclosures of the aforementioned applications are hereby incorporated by reference in their entireties.

TECHNICAL FIELD

This application relates to the field of communications technologies, and in particular, to a secondary cell control method and an apparatus.

BACKGROUND

In a long term evolution (LTE) system, a time for user equipment (UE) to perform activation or deactivation processing on a secondary cell (SCell) is eight subframes that are fixed at 8 milliseconds (ms).

In a flexible communications system, for example, a new radio (NR) system, to adapt to transmission of data of different service types, a time unit of data scheduling changes flexibly. Therefore, a time required for controlling activation or deactivation of a secondary cell in the existing LTE system is no longer applicable to the NR system.

SUMMARY

This application provides a secondary cell control method and an apparatus, to resolve a prior-art problem that a time required for controlling activation or deactivation of a secondary cell in an LTE system is not applicable to an NR system with a flexible configuration.

The method in this application includes:

According to a first aspect, an embodiment of this application provides a secondary cell control method. An apparatus for performing the control method may be a terminal device, or may be another apparatus that can support a terminal device in implementing the method, for example, an apparatus that may be disposed in the terminal device. The apparatus that may be disposed in the terminal device may be a chip system, a module, a circuit, or the like. This is not specifically limited in this application.

The method includes: receiving control information in a time unit n, where the control information may include an activation command for a first secondary cell or a deactivation command for a first secondary cell.

when the control information includes the activation command for the first secondary cell, sending first information of the first secondary cell in a time unit n+k, where k is determined based on a first frame structure parameter configured for the terminal device, both n and k are positive integers, and the first information may be a channel state information (CSI) report.

when the control information includes the activation command for the first secondary cell, after the control information is received in the time unit n, sending second information of the first secondary cell no earlier than the time unit n+k, or receiving third information of the first secondary cell no earlier than the time unit n+k, or monitoring fourth information of the first secondary cell no earlier than the time unit n+k, or starting or restarting a deactivation timer of the first secondary cell no earlier than the time unit n+k.

For example, the second information may include a sounding reference signal (SRS) of the first secondary cell and/or a physical uplink control channel (PUCCH) on the first secondary cell.

For example, the third information may include a physical downlink control channel (PDCCH) and/or a physical downlink shared channel (PDSCH).

For example, the fourth information may include a PDCCH on the first secondary cell and/or a PDCCH on which the secondary cell is monitored and scheduled.

When the control information includes the deactivation command for the first secondary cell, after the control information is received in the time unit n, the time unit n+k is not used to transmit the first information of the first secondary cell.

When the control information includes the deactivation command for the first secondary cell, after the control information is received in the time unit n, the deactivation timer of the first secondary cell is stopped and/or a hybrid automatic repeat request (HARQ) buffer corresponding to the first secondary cell is cleared no later than the time unit n+k.

In the foregoing solution, the terminal device determines a value of k based on the frame structure parameter configured by a network device for the terminal device, that is, different frame structure parameters correspond to corresponding values of k, so that a time required for controlling activation or deactivation of the secondary cell is flexibly determined, and a waste of time resources caused by fixed 8 ms can be avoided.

In a possible design, the sending first information of the first secondary cell in a time unit n+k may be implemented in the following manner:

sending the first information of the first secondary cell in a first cell in the time unit n+k, where the first cell is an activated cell in the time unit n+k; or sending the first information of the first secondary cell in a first cell in an earliest time unit, where the first cell is an inactivated cell in the time unit n+k, and the earliest time unit is an earliest time unit in which the first cell is activated after the time unit n+k. The earliest time unit is a start time unit in which the first cell is activated after the time unit n+k.

In a possible design, the first frame structure parameter includes a subcarrier spacing and/or a cyclic prefix.

According to the foregoing design, in an NR system, different values of k are flexibly determined based on a subcarrier spacing and/or a cyclic prefix, so that a time required for controlling activation or deactivation of a secondary cell is flexibly determined, and a waste of time resources caused by fixed 8 ms can be avoided.

In a possible design, that k is determined based on a first frame structure parameter configured for the terminal device includes: k is determined based on a processing time, and the processing time may be determined based on at least one of the following:

a processing time of the terminal device for a physical downlink shared channel PDSCH, where the processing time of the terminal device for the physical downlink shared channel PDSCH is determined based on the first frame structure parameter;

a downlink data HARQ feedback time configured for the terminal device, where the downlink data HARQ feedback time is a quantity of time units from when a downlink shared channel PDSCH is received to when corresponding HARQ feedback information is sent on a PUCCH or a physical uplink shared channel (PUSCH), and the downlink data HARQ feedback time is determined based on the first frame structure parameter;

a preparation time of the terminal device for a channel state information CSI report, where the preparation time of the terminal device for the CSI report is determined based on the first frame structure parameter;

a preparation time of the terminal device for a physical uplink shared channel PUSCH, where the preparation time of the terminal device for the physical uplink shared channel PUSCH is determined based on the first frame structure parameter; and a CSI calculation time of the terminal device, where the CSI calculation time of the terminal device is determined based on the first frame structure parameter.

In a possible implementation, the downlink data HARQ feedback time may be determined by using a feedback time indicator field in downlink control information DCI in combination with the first frame structure parameter.

An uplink data scheduling time is configured for the terminal device, where the uplink data scheduling time is a difference between a quantity of time units in which uplink scheduling control information is sent and a quantity of time units in which uplink data is sent, and the uplink data scheduling time is determined based on the first frame structure parameter.

According to the foregoing design, the processing time is determined based on a time parameter related to the first frame structure parameter, and k is flexibly determined based on the processing time, so that a time required for controlling activation or deactivation of the secondary cell is flexibly determined, and a waste of time resources caused by fixed 8 ms can be avoided.

In a possible design, based on the time parameter related to the first frame structure parameter, the processing time may be further determined based on at least one of the following:

a processing time of a media access control (MAC) layer of the terminal device;

a radio frequency adjustment time of the terminal device;

a preparation time or an end time for the terminal device to perform baseband processing on the secondary cell; and a time difference for the terminal device to send signals in different cells.

In a possible design, the time unit may be a slot or a symbol.

In a possible design, when the time unit is a slot, k meets the following condition:

$$k = \text{ceil}(N_{slot}^{subframe,\mu} \times T_{absolute\ time} \div T_{sf}).$$

$T_{absolute\ time}$ represents a value of the processing time measured in an absolute time, $N_{slot}^{subframe,\mu}$ represents a quantity of slots included in a subframe corresponding to the first frame structure parameter, ceil(x) returns a minimum integer greater than or equal to x, and $T_{sf}$ represents duration of the subframe.

In a possible design, when the time unit is a symbol, k meets the following condition:

$$k = \text{ceil}(T_{absolute\ time} \div T_{symbol\ duration}).$$

$T_{absolute\ time}$ represents a value of the processing time measured in an absolute time, ceil(x) returns a minimum integer greater than or equal to x, and $T_{symbol\ duration}$ represents duration of a symbol corresponding to the first frame structure parameter.

In a possible design, an index of the first frame structure parameter is:

a smaller value in a frame structure parameter index of the first secondary cell and a frame structure parameter index of a second secondary cell, where the control information further includes an activation command or a deactivation command for the second secondary cell;

a smallest value in frame structure parameter indexes of cells that are configured for the terminal device;

a smallest value in a frame structure parameter index of the first secondary cell, a frame structure parameter index of a second secondary cell, and a frame structure parameter index of a cell used to transmit the first information, where the control information further includes an activation command or a deactivation command for the second secondary cell; or a frame structure parameter with a smaller index value in a second frame structure parameter and a frame structure parameter that corresponds to a cell used to transmit the control information.

According to the foregoing design, a frame structure parameter with a relatively small index value is used, that is, a frame structure parameter with relatively long time duration is used, thereby ensuring that a determined transmission time meets requirements of some cells.

In a possible design, when the control information includes only the activation command for the first secondary cell, the second frame structure parameter is a frame structure parameter corresponding to the first secondary cell.

When the control information further includes the activation command or the deactivation command for the second secondary cell, the second frame structure parameter is a frame structure parameter with a smaller index value in the frame structure parameter corresponding to the first secondary cell and a frame structure parameter corresponding to the second secondary cell.

Based on a same inventive concept as that of the first aspect, according to a second aspect, an embodiment of this application provides an apparatus. The apparatus may be a terminal device, or may be another apparatus that can support a terminal device in implementing the method. For example, the apparatus may be an apparatus in the terminal device. The apparatus includes a receiving module and a sending module. The modules may perform corresponding functions of the terminal device in any design example of the first aspect. Specifically:

The receiving module is configured to receive control information in a time unit n, where the control information includes an activation command for a first secondary cell or a deactivation command for a first secondary cell.

When the control information includes the activation command for the first secondary cell, the sending module is configured to send first information of the first secondary cell in a time unit n+k. k is determined based on a first frame structure parameter configured for the terminal device, and both n and k are positive integers.

Alternatively, when the control information includes the activation command for the first secondary cell, the sending module is configured to: after the control information is received in the time unit n, send second information of the first secondary cell no earlier than the time unit n+k.

Alternatively, when the control information includes the activation command for the first secondary cell, the receiving module may be further configured to receive third information of the first secondary cell no earlier than a time unit n+k, or monitor fourth information of the first secondary cell no earlier than a time unit n+k.

Alternatively, the apparatus may further include a processing module. When the control information includes the activation command for the first secondary cell, the processing module is configured to start or restart a deactivation timer of the first secondary cell no earlier than a time unit n+k.

For example, the second information may include an SRS on the first secondary cell and/or a PUCCH on the first secondary cell.

For example, the third information may include a physical downlink control channel PDCCH and/or a physical downlink shared channel PDSCH.

For example, the fourth information may include a PDCCH on the first secondary cell and/or a PDCCH on which the secondary cell is monitored and scheduled.

When the control information includes the deactivation command for the first secondary cell, after the receiving module receives the control information in the time unit n, the time unit n+k is not used to transmit the first information of the first secondary cell.

When the control information includes the deactivation command for the first secondary cell, after the receiving module receives the control information in the time unit n, the processing module is configured to stop the deactivation timer of the first secondary cell and/or clear a HARQ buffer corresponding to the first secondary cell no later than the time unit n+k.

In a possible design, for specific content included in the first frame structure parameter, refer to specific descriptions of a single frame structure parameter in the first aspect. This is not specifically limited herein.

In a possible design, k is determined based on the first frame structure parameter configured for the terminal device. For specific content, refer to related descriptions in the first aspect. This is not specifically limited herein.

According to a third aspect, an embodiment of this application further provides an apparatus. The apparatus may be a terminal device, and is configured to implement the method described in the first aspect. Alternatively, the apparatus may be another apparatus that can support a terminal device in implementing the method described in the first aspect, for example, an apparatus that may be disposed in the terminal device. The apparatus that may be disposed in the terminal device may be a chip system, a module, a circuit, or the like. This is not specifically limited in this application. The apparatus includes a processor, configured to implement functions of the terminal device in the method described in the first aspect. The apparatus may further include a memory, configured to store a program instruction and data. The memory is coupled to the processor, and the processor invokes and executes the program instruction stored in the memory, to implement the functions of the terminal device in the method described in the first aspect. The apparatus may further include a communications interface. The communications interface is configured to implement communication between the apparatus and another device. For example, the another device is a network device. In this embodiment of this application, the communications interface may include a circuit, a bus, an interface, a communications interface, or any other apparatus that can implement a communication function.

In a possible device, the apparatus includes:
the communications interface;
the memory, configured to store the program instruction; and
the processor, configured to receive control information in a time unit n through the communications interface, where the control information includes an activation command for a first secondary cell or a deactivation command for a first secondary cell.

When the control information includes the activation command for the first secondary cell, the processor sends first information of the first secondary cell in a time unit n+k through the communications interface. k is determined based on a first frame structure parameter configured for the terminal device, and both n and k are positive integers.

Alternatively, when the control information includes the activation command for the first secondary cell, after receiving the control information in the time unit n through the communications interface, the processor sends second information of the first secondary cell no earlier than a time unit n+k.

Alternatively, when the control information includes the activation command for the first secondary cell, the processor may further receive third information of the first secondary cell no earlier than a time unit n+k through the communications interface, or the processor may be further configured to monitor fourth information of the first secondary cell no earlier than a time unit n+k.

Alternatively, when the control information includes the activation command for the first secondary cell, the processor is configured to start or restart a deactivation timer of the first secondary cell no earlier than a time unit n+k.

Alternatively, when the control information includes the deactivation command for the first secondary cell, after the processor receives the control information in the time unit n through the communications interface, a time unit n+k is not used to transmit first information of the first secondary cell.

Alternatively, when the control information includes the deactivation command for the first secondary cell, after the processor receives the control information in the time unit n through the communications interface, the processor is configured to stop a deactivation timer of the first secondary cell and/or clear a HARQ buffer corresponding to the first secondary cell no later than a time unit n+k.

In a possible design, for specific content included in the first frame structure parameter, refer to specific descriptions of a single frame structure parameter in the first aspect. This is not specifically limited herein.

In a possible design, k is determined based on the first frame structure parameter configured for the terminal device. For specific content, refer to related descriptions in the first aspect. This is not specifically limited herein.

According to a fourth aspect, an embodiment of this application provides a secondary cell control method, including:
sending control information in a time unit n, where the control information may include an activation command for a first secondary cell or a deactivation command for a first secondary cell; and
when the control information includes the activation command for the first secondary cell, receiving first information of the first secondary cell in a time unit n+k, where k is determined based on a first frame structure parameter configured for a terminal device, both n and k are positive integers, and the first information may be a CSI report; or when the control information includes the deactivation command for the first secondary cell, skipping transmitting first information of the first secondary cell by using a time unit n+k.

Specifically, an apparatus for performing the control method may be a network device, or may be an apparatus disposed in a network device. The apparatus disposed in the network device may be a chip, a module, a circuit, or the like. This is not specifically limited in this application.

Specifically, the network device may send the control information to the terminal device, and receive the first information sent by the terminal device.

In a possible design, the receiving first information of the first secondary cell in a time unit n+k may be implemented in the following manner:

receiving the first information of the first secondary cell in a first cell in the time unit n+k, where the first cell is an activated cell in the time unit n+k; or sending the first information of the first secondary cell in a first cell in an earliest time unit, where the first cell is an inactivated cell in the time unit n+k, and the earliest time unit is an earliest time unit in which the first cell is activated after the time unit n+k. The earliest time unit is a start time unit in which the first cell is activated after the time unit n+k.

In a possible design, for a related description in which k is determined based on the first frame structure parameter configured for the terminal device, refer to the description in the first aspect. This is not specifically limited herein.

Based on a same inventive concept as that of the fourth aspect, according to a fifth aspect, an embodiment of this application provides an apparatus. The apparatus may be a network device, or may be another apparatus that can support a network device in implementing the method, for example, an apparatus in the network device. The apparatus in the network device may be a chip system, a module, a circuit, or the like. This is not specifically limited in this application. In this embodiment of this application, the chip system may include a chip, or may include a chip and another discrete device. The apparatus may include a sending module and a receiving module. The modules may perform corresponding functions performed by the network device in any design example of the fourth aspect.

The sending module is configured to send control information in a time unit n, where the control information may include an activation command for a first secondary cell or a deactivation command for a first secondary cell.

When the control information includes an activation command for the first secondary cell, the receiving module is configured to receive first information of the first secondary cell in a time unit n+k. k is determined based on a first frame structure parameter configured for a terminal device, and both n and k are positive integers. The first information may be a CSI report.

When the control information includes the deactivation command for the first secondary cell, the receiving module is configured to not receive first information of the first secondary cell in a time unit n+k.

In a possible design, the receiving module is specifically configured to:

receive the first information of the first secondary cell in a first cell in the time unit n+k, where the first cell is an activated cell in the time unit n+k; or send the first information of the first secondary cell in a first cell in an earliest time unit, where the first cell is an inactivated cell in the time unit n+k, and the earliest time unit is an earliest time unit in which the first cell is activated after the time unit n+k. The earliest time unit is a start time unit in which the first cell is activated after the time unit n+k.

In a possible design, for a related description in which k is determined based on the first frame structure parameter configured for the terminal device, refer to the description in the first aspect. This is not specifically limited herein.

According to a sixth aspect, an embodiment of this application further provides an apparatus. The apparatus may be a network device, and is configured to implement the method described in the fourth aspect. Alternatively, the apparatus may be another apparatus that can support a network device in implementing the method described in the fourth aspect, for example, an apparatus that may be disposed in the network device. The apparatus that may be disposed in the network device may be a chip system, a module, a circuit, or the like. This is not specifically limited in this application. The apparatus includes a processor, configured to implement functions of the network device in the method described in the fourth aspect. The apparatus may further include a memory, configured to store a program instruction and data. The memory is coupled to the processor, and the processor may invoke and execute the program instruction stored in the memory, to implement the functions of the network device in the method described in the fourth aspect. The apparatus may further include a communications interface. The communications interface is configured to implement communication between the apparatus and another device. For example, the another device is a terminal device.

In a possible device, the apparatus includes:

the communications interface;

the memory, configured to store the program instruction; and the processor, configured to send control information in a time unit n through the communications interface, where the control information may include an activation command for a first secondary cell or a deactivation command for a first secondary cell.

When the control information includes the activation command for the first secondary cell, the processor is further configured to receive first information of the first secondary cell in a time unit n+k through the communications interface. k is determined based on a first frame structure parameter configured for the terminal device, and both n and k are positive integers. The first information may be a CSI report.

When the control information includes the deactivation command for the first secondary cell, the processor does not receive first information of the first secondary cell in a time unit n+k.

In a possible design, the processor specifically receives the first information of the first secondary cell in a first cell in the time unit n+k through the communications interface, where the first cell is an activated cell in the time unit n+k; or sends the first information of the first secondary cell in a first cell in an earliest time unit, where the first cell is an inactivated cell in the time unit n+k, and the earliest time unit is an earliest time unit in which the first cell is activated after the time unit n+k. The earliest time unit is a start time unit in which the first cell is activated after the time unit n+k.

In a possible design, for a related description in which k is determined based on the first frame structure parameter configured for the terminal device, refer to the description in the first aspect. This is not specifically limited herein.

According to a seventh aspect, an embodiment of this application further provides a computer-readable storage medium. The storage medium stores a program instruction. When the program instruction is read and executed by one or more processors, the method according to any one of the first aspect or the designs of the first aspect may be implemented, or the method according to any one of the fourth aspect or the designs of the fourth aspect may be implemented.

According to an eighth aspect, an embodiment of this application further provides a computer-readable storage medium. The storage medium stores a program instruction. When the program instruction is executed on a computer, the computer is enabled to perform the method according to any one of the first aspect or the designs of the first aspect, or the computer is enabled to perform the method according to any one of the fourth aspect or the designs of the fourth aspect.

According to a ninth aspect, an embodiment of this application provides a computer program product including an instruction. When the computer program product runs on a computer, the computer is enabled to perform the method according to any one of the first aspect or the designs of the first aspect, or implement the method according to any one of the fourth aspect or the designs of the fourth aspect.

According to a tenth aspect, an embodiment of this application provides a chip system. The chip system includes a processor, and may further include a memory, configured to implement functions of the terminal device or the network device in the foregoing method. The chip system may include a chip, or may include a chip and another discrete device.

According to an eleventh aspect, an embodiment of this application provides a system. The system includes the apparatus according to the second aspect or the third aspect and the apparatus according to the fifth aspect or the sixth aspect.

BRIEF DESCRIPTION OF DRAWINGS

FIG. 4 is a schematic structural diagram of another MAC CE according to an embodiment of this application;

DESCRIPTION OF EMBODIMENTS

Figure 1:
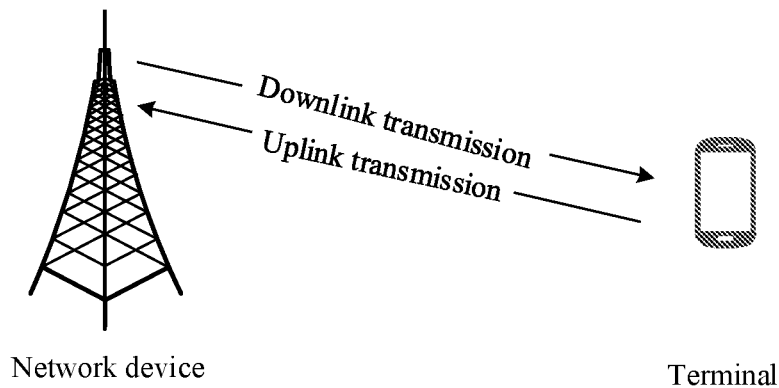
FIG. 1 is a schematic architectural diagram of a communications system according to an embodiment of this application.

The embodiments of this application may be applied to, but not limited to, an NR system, and may be further applied to an LTE system, a communications system such as a long term evolution-advanced (LTE-A) system or an enhanced long term evolution technology (eLTE), or may be extended to related cellular systems such as a wireless fidelity (Wi-Fi) communications system, a worldwide interoperability for microwave access (wimax) communications system, a future wireless communications system, and a 3GPP communications system. Specifically, a communications system architecture to which the embodiments of this application are applied may be shown in FIG. 1, and includes a network device and at least one terminal. It should be noted that a quantity of terminals in the communications system shown in FIG. 1 is not limited in the embodiments of this application.

In the following, some terms in this application are described, to help a person skilled in the art have a better understanding.

(1) A network device is a device that connects a terminal to a wireless network in a communications system. The network device is a node in a radio access network, may also be referred to as a base station, or may also be referred to as a radio access network (RAN) node (or device). Currently, some examples of network devices are a gNB, a transmission reception point (TRP), an evolved NodeB (eNB), a radio network controller (RNC), a NodeB (NB), a base station controller (BSC), a base transceiver station (BTS), a home NodeB (for example, a home evolved NodeB, or a home NodeB, HNB), a baseband unit (BBU), a wireless fidelity (Wi-Fi) access point (AP), and the like. In addition, in a network structure, the network device may include a centralized unit (CU) node and a distributed unit (DU) node. In this structure, protocol layers of an eNB in a long term evolution (LTE) system are separated. Functions of some protocol layers are centrally controlled by the CU, and functions of some or all of the remaining protocol layers are distributed in the DU, and the CU centrally controls the DU.

(2) A terminal, also referred to as a terminal device, user equipment (UE), a mobile station (MS), a mobile terminal (MT), or the like, is a device that provides voice and/or data connectivity for a user, for example, a handheld device or a vehicle-mounted device with a wireless connection function. Currently, examples of some terminals are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, and the like.

(3) Carrier aggregation

Carrier aggregation (CA) is to aggregate two or more component carriers (CC) to support a larger transmission bandwidth.

Figure 2:
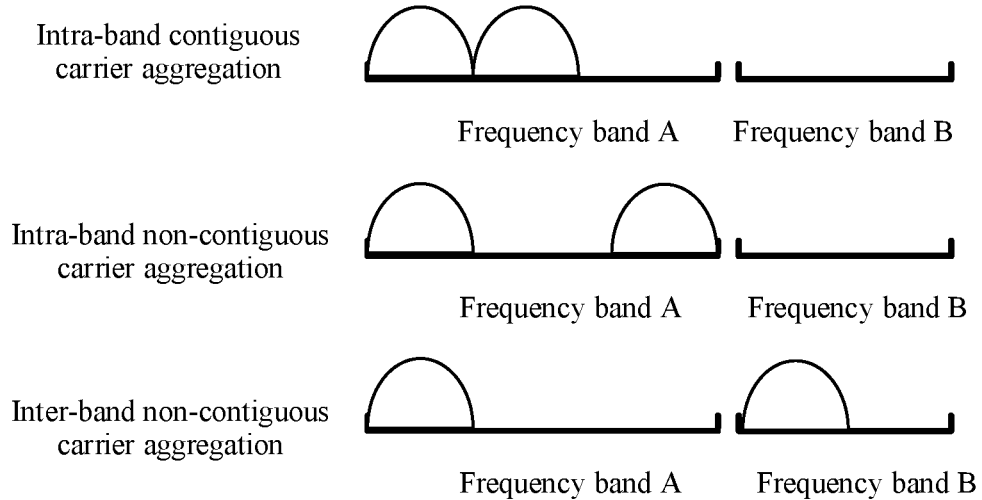
FIG. 2 is a schematic diagram of a carrier according to an embodiment of this application.

One downlink component carrier corresponds to one independent cell. Usually, one downlink component carrier is equivalent to one cell. One cell may include one downlink carrier and one uplink carrier, or only one downlink carrier. In a time division duplexing (TDD) duplex mode, a downlink carrier and an uplink carrier are on a same carrier. To efficiently use fragmented spectrums, carrier aggregation supports aggregation of different component carriers. The different component carriers described herein may be component carriers with a same bandwidth or different bandwidths, or adjacent or non-adjacent component carriers in a same frequency band, or may be component carriers in different frequency bands. Based on this, carrier aggregation may be classified into intra-band contiguous carrier aggregation, intra-band non-contiguous carrier aggregation, and inter-band non-contiguous carrier aggregation, as shown in FIG. 2.

A component carrier corresponding to a primary cell (PCell) is referred to as a primary component carrier (PCC). A downlink carrier of the PCell is referred to as a downlink primary component carrier (DL PCC). An uplink carrier of the PCell is referred to as an uplink primary component carrier (UL PCC). The PCell may be a cell to which the terminal device initially connects, or a cell to which radio resource control (RRC) connection reestablishment is performed, or may be a primary cell specified in a cell handover process. The PCell is responsible for RRC communication with a terminal device.

A component carrier corresponding to a secondary cell (SCell) is referred to as a secondary component carrier (SCC). A downlink carrier of the SCell is referred to as a downlink secondary component carrier (DL SCC). An uplink carrier of the SCell is referred to as an uplink secondary component carrier (UL SCC). The SCell is added during RRC connection reconfiguration and is used to provide an additional radio resource. The SCell may be added, modified, or released through an RRC connection reconfiguration message after an initial security activation procedure. There is no RRC communication between the SCell and the terminal device.

A serving cell is a cell that provides a service (uplink and downlink transmission) for the terminal device. If the terminal device is in an RRC_CONNECTED mode but no CA is configured, the terminal device has only one serving cell, that is, a PCell. If the terminal device is in an RRC_CONNECTED mode and CA is configured, serving cells of the terminal device include a PCell and all SCells. In other words, the serving cell may refer to either a PCell or an SCell. Both the PCell and the SCell are serving cells.

(4) Activation or deactivation of a secondary component carrier.

Activation or deactivation of a secondary component carrier may also be referred to as activation or deactivation of a secondary cell.

Except for a PCell, a configured SCell cannot be used immediately after being configured. To better manage battery consumption of a terminal device configured with CA, LTE provides an SCell activation/deactivation mechanism.

It should be noted that the PCell does not support activation/deactivation. In other words, the PCell of the terminal device is always in an active state.

When the SCell is in the active state, the terminal device may perform the following operation on a component carrier corresponding to the SCell: sending a sounding reference signal (SRS); or reporting channel state information (CSI); or detecting a physical downlink control channel (PDCCH) used for the SCell and a PDCCH transmitted on the SCell. When cross-carrier scheduling is configured for carrier aggregation, if the SCell is scheduled by another cell, there is a PDCCH for the scheduled SCell on the scheduling cell, and this PDCCH is referred to as the PDCCH used for the SCell. If it is configured to transmit a physical uplink control channel (PUCCH) on a component carrier corresponding to the SCell, the PUCCH may be sent on the component carrier corresponding to the SCell.

When the SCell is in an inactive state, the terminal device does not send an SRS, does not report CSI, does not transmit uplink data on the component carrier corresponding to the SCell, where the uplink data herein includes an uplink shared channel (UL-SCH) and a random access channel (RACH), does not detect a PDCCH used for the SCell and a PDCCH transmitted on the SCell, and does not transmit a PUCCH.

Activation of the SCell may be implemented based on a media access control (MAC) control element (CE). A deactivation mechanism of the SCell may be implemented based on a MAC CE, or may be implemented based on a deactivation timer. A value of the deactivation timer may be configured by the network device.

The network device configures a plurality of secondary component carriers, for example, C1 to C7, for the terminal device by using RRC signaling. The configured secondary component carriers cannot be used immediately. Only an activated SCC can be used.

The following briefly describes a process in which the network device activates or deactivates the secondary cell based on the MAC CE.

The network device sends, to the terminal device, control signaling, or referred to as a MAC CE for activation/deactivation. The control signaling is used to indicate to activate or deactivate the secondary cell.

Figure 3:
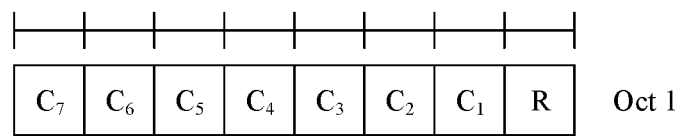
FIG. 3 is a schematic structural diagram of a MAC CE according to an embodiment of this application.

A MAC CE for activation/deactivation of an SCell may be in a structure shown in FIG. 3. Ci is used to indicate an activated/deactivated state of an SCell whose index number field (SCell Index-r10) is set to i. If Ci is set to 1, it indicates that the corresponding SCell is activated. If Ci is set to 0, it indicates that the corresponding SCell is deactivated. When a quantity of SCells in carrier aggregation is less than 7, a format of the MAC CE in FIG. 3 may be used. In FIG. 3, Oct indicates an octet used in an internet standard.

When the quantity of SCells in carrier aggregation is greater than 7 and less than 31, a format of a MAC CE for activation/deactivation of an SCell shown below in FIG. 4 may be used.

It should be noted that a 3rd generation partnership project (3GPP) protocol does not explicitly specify when the network device should activate/deactivate the SCell, and this depends on implementation by a manufacturer (usually related to a load of a terminal device).

Figure 5:
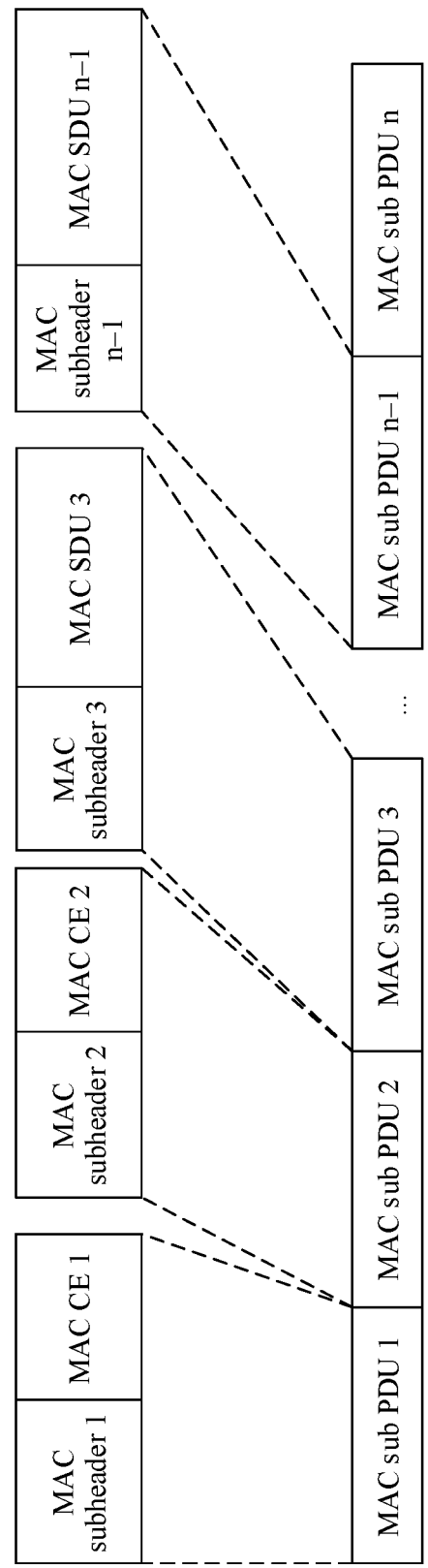
FIG. 5 is a schematic structural diagram of a MAC PDU according to an embodiment of this application.

The network device forms a MAC protocol data unit PDU by using a MAC CE for activation or deactivation of an SCell, and the MAC protocol data unit PDU is processed at a physical layer and then sent to the terminal device through an air interface. One MAC PDU may include one or more MAC CEs. A format of a complete MAC PDU is shown in FIG. 5, and the MAC PDU includes one or more MAC sub PDUs. A MAC sub PDU may include a MAC subheader and a content part of the MAC sub PDU. Alternatively, the MAC sub PDU may be a sub PDU used for padding. The content part of the MAC sub PDU may be a fixed-sized MAC CE or a variable-sized MAC CE, or the content part of the MAC sub PDU may be a MAC service data unit (SDU). The MAC SDU refers to data transmitted from an upper layer. As shown in FIG. 5, the MAC PDU includes n MAC sub PDUs. A MAC sub PDU 1 and a MAC sub PDU 2 each include a MAC subheader and a MAC CE. The MAC sub PDU 1 includes a MAC subheader 1 and a MAC CE 1, and the MAC sub PDU 2 includes a MAC subheader 2 and a MAC CE 2. A MAC sub PDU 3 to a MAC sub PDU n−1 each include a MAC subheader and a MAC SDU. For example, the MAC sub PDU 3 includes a MAC subheader 3 and a MAC SDU 3, and the MAC sub PDU n−1 includes a MAC subheader n−1 and a MAC SDU n−1.

The MAC sub PDU including MAC CEs distinguishes each MAC CE by using a logical channel identifier (LCID) in a MAC subheader. For example, LCIDs used to distinguish the foregoing two types of MAC CEs (MAC CE 1 and MAC CE 2) for activation/deactivation of an SCell are shown in Table 1.

TABLE 1

| Index | LCID values |
|---|---|
| 111001 | Activation or deactivation of an SCell (four octets) |
| 111010 | Activation or deactivation of an SCell (one octet) |

The network device sends a MAC CE for activation/deactivation to the terminal device. For an SCell that has been configured but has not been activated, the terminal device may activate the SCell based on information in the MAC CE. Further, for an activated SCell, the network device may deactivate one or more activated SCells by using the MAC CE. In addition, the terminal device may further deactivate an SCell based on a deactivation timer mechanism of the SCell.

(5) Numerology

In a system based on orthogonal frequency division multiplexing (OFDM), for example, an NR system, data transmission may be performed between a network device and a terminal device by using an air interface resource. The air interface resource may include a time-frequency resource. A minimum unit of the time-frequency resource is a resource element (RE). One RE corresponds to one symbol in time domain and corresponds to one subcarrier in frequency domain. In frequency domain, a spacing between adjacent subcarriers may be described as a subcarrier spacing.

A frame structure parameter may be referred to as a numerology. A basic frame structure parameter includes a subcarrier spacing and/or a cyclic prefix. A parameter corresponding to the frame structure parameter may further include one or more parameters such as symbol duration and slot duration. In a 5G technology, a plurality of frame structure parameters (numerology) may be configured for a terminal, and may be used together or at the same time, to support a plurality of service scenarios. For example, a subcarrier spacing (SCS) with a relatively small value corresponds to relatively long symbol duration and relatively long slot duration and may be used to transmit a latency-insensitive service, and an SCS with a relatively large value corresponds to relatively short symbol duration and relatively short slot duration and may be used to transmit a latency-sensitive low-latency service.

It should be noted that, for a specific CP length, a subcarrier spacing may be inversely proportional to symbol duration, and slot duration may be directly proportional to symbol duration. The basic frame structure parameter numerology may be defined by using a subcarrier spacing and/or a CP. If no CP is defined, a normal CP is used by default. A plurality of numerologies currently supported by an NR system are provided in Table 2.

TABLE 2

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 2, $\Delta f$ represents a subcarrier spacing (SCS), and P represents an index of a numerology.

For a time domain resource, a plurality of time units may be defined in time domain. For example, a slot may be defined, and one slot may include one or more symbols. A subframe may be further defined, and one subframe may include one or more slots. A frame may also be defined, and one frame includes one or more subframes. Time units usually used in a communications system, such as an NR system, are classified into, but not limited to, several types shown in Table 3 in descending order.

TABLE 3

| Time unit | Representing a symbol and time duration | Meaning |
|---|---|---|
| Frame | Represented by Frame, with time duaration being $T_f = \left(\frac{\Delta f_{max} N_f}{100}\right) \cdot T_c = 10$ ms $\Delta f_{max} = 480 \cdot 10^3$ HZ, and $N_f = 4096$; and $T_c$ represents a minimum time unit corresponding to 4096 points during fast Fourier transform FFT digital calculation at a physical layer | $T_f$ represents time duration of the frame. The time duration of the frame is measured in an absolute time, and may be referred to as time duration of the frame. The frame has fixed time duration and is irrelevant to the numerology |
| Subframe | Represented by Subframe, with time duration being $T_{sf} = (\Delta f_{max} N_f \div 1000) \cdot T_c = 1$ ms | $T_{sf}$ represents time duration of the subframe. The subframe has fixed time duration and is irrelevant to the numerology |

TABLE 3-continued

| Time unit | Representing a symbol and time duration | Meaning |
|---|---|---|
| Slot | Represented by Slot | Time duration of the slot is related to the numerology. The time duration of the slot may be represented as a quantity of symbols included in the slot. For details, refer to Table 4 and Table 5 |
| OFDM symbol (symbol for short) | Represented by Symbol | Time duration of the symbol is related to the numerology, and may be specifically determined based on Table 4 and Table 5 |

Table 4 includes quantities that of symbols included in one slot and that correspond to different numerologies under a normal cyclic prefix, a quantity of slots included in one frame, and a quantity of slots included in one subframe. Table 5 includes a quantity of symbols included in one slot corresponding to different numerologies under an extended cyclic prefix, a quantity of slots included in one frame, and a quantity of slots included in one subframe.

TABLE 4

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 5

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

As shown in Table 4 and Table 5, $N^{slot}_{symb}$ represents a quantity of symbols included in one slot, $N^{frame,\mu}_{slot}$ represents a quantity of slots included in a frame corresponding to the numerology, and $N^{frame,\mu}_{slot}$ represents a quantity of slots included in a subframe corresponding to the numerology.

Figure 6:
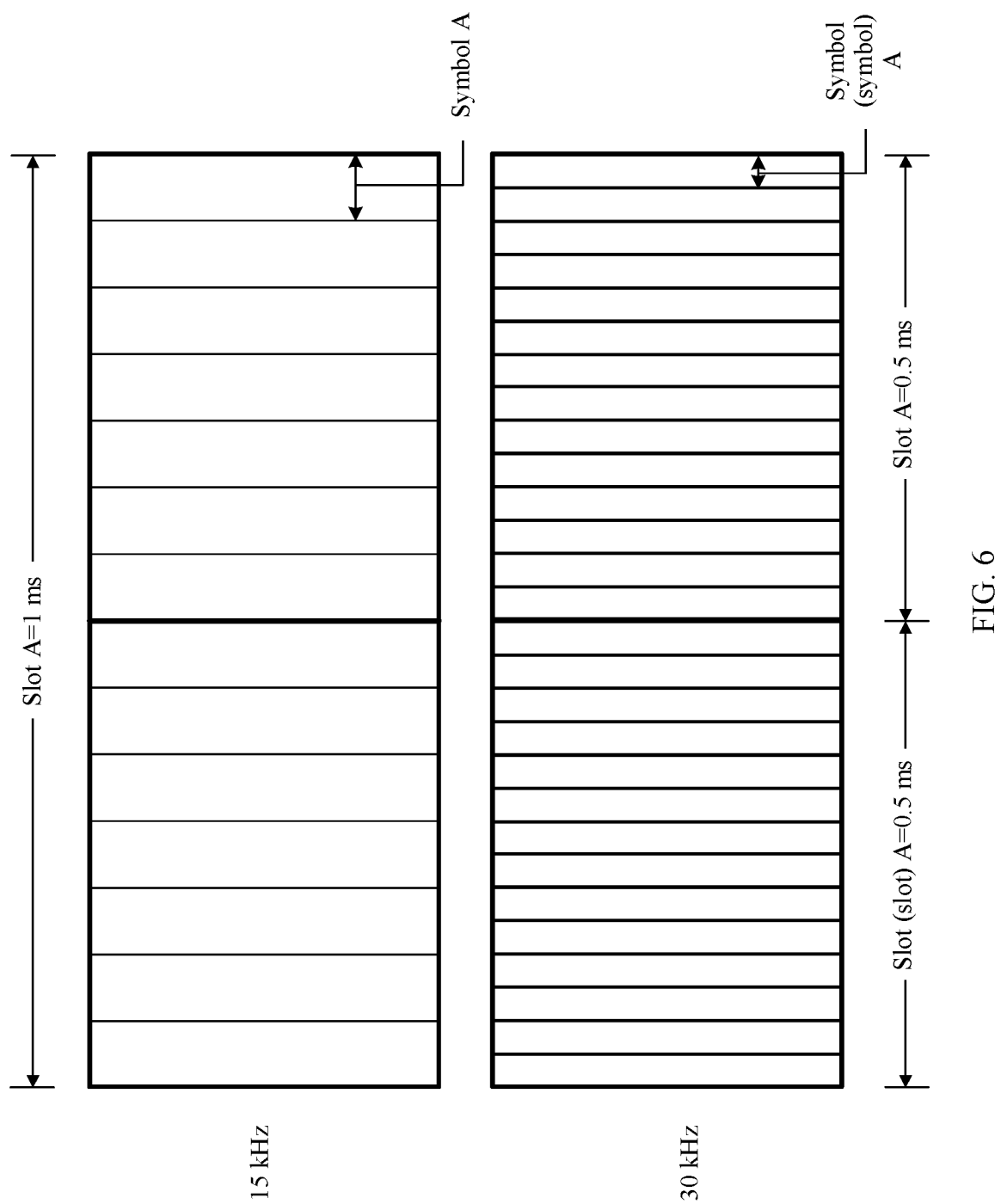
FIG. 6 is a schematic structural diagram of symbols included in different slots according to an embodiment of this application.

If a subcarrier spacing Δf1 is k times of another subcarrier spacing 42, Δf1=k×Δf2. A sum of lengths of time units corresponding to k Δf2's is equal to a length of a time unit corresponding to one Δf1. FIG. 6 shows a relationship between a time unit of 15 kHz and a time unit of 30 kHz. A sum of lengths of two 30 kHz symbols is equal to a length of one 15 kHz symbol. A sum of lengths of two 30 kHz slots is equal to a length of one 15 kHz slot.

(6) A bandwidth part (BWP) that may also be referred to as a carrier bandwidth part. The BWP includes several consecutive resource units in frequency domain, for example, resource blocks (RB). The bandwidth part may be a downlink bandwidth part or an uplink bandwidth part. The terminal device receives or sends data on a data channel in an activated bandwidth part.

In a cell, the network device may configure a plurality of BWPs (for example, a maximum of four BWPs in the uplink and a maximum of four BWPs in the downlink) for the terminal device in the uplink or downlink. Each BWP is independently configured with a numerology, and different BWPs may be configured with a same numerology or different numerologies. The network device may activate only one of the plurality of uplink or downlink BWPs for the terminal device, and the terminal device can receive or send data only on an activated BWP. In the embodiments of this application, a frame structure parameter corresponding to a cell is a frame structure parameter corresponding to an activated BWP in the cell.

Figure 7A:
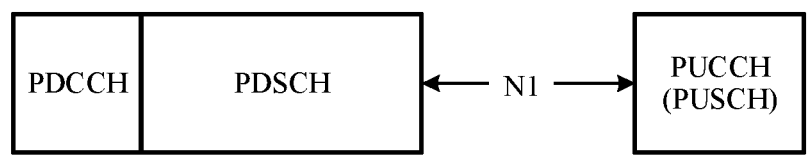
FIG. 7A is a schematic diagram of N1 according to an embodiment of this application.

(7) Time parameter of the terminal device (7.1). A processing time of the terminal device for a physical downlink shared channel (PDSCH). The processing time of the terminal device for the PDSCH is a time from a last symbol on which the terminal device receives the PDSCH to a first uplink symbol on which a physical channel that carries hybrid automatic repeat request (HARQ) feedback information is received. The HARQ feedback information is valid HARQ feedback information. The HARQ feedback may include receiving of a correct acknowledgment feedback or receiving of an incorrect acknowledgment feedback. The receiving of a correct acknowledgment feedback may be represented by an acknowledgment (ACK), and the receiving of an incorrect acknowledgment feedback may be represented by a negative-acknowledgment (NACK). The processing time of the terminal device for the PDSCH may be measured in units of symbols. Specifically, a basic part of the processing time of the terminal device for the PDSCH may be represented by N1, as shown in FIG. 7A. A value of N1 varies with different numerologies. Table 6 is used to describe values of N1 in different numerologies and different demodulation reference signal (DMRS) configurations of a terminal device with a common processing capability. Table 7 is used to describe values of N1 in different numerologies and different DMRS configurations of a terminal device with an enhanced processing capability. A DMRS configuration 1 represents a pre-loaded DMRS configuration status. A DMRS configuration 2 represents a status with an additional DMRS configuration.

TABLE 6

| | N1 [symbols (a quantity of symbols)] | |
|---|---|---|
| $\mu$ | DMRS configuration 1 | DMRS configuration 2 |
| 0 | 8 | 13 |
| 1 | 10 | 13 |
| 2 | 17 | 20 |
| 3 | 20 | 24 |

TABLE 7

| | N1 [symbols] | |
|---|---|---|
| $\mu$ | DMRS configuration 1 | DMRS configuration 2 |
| 0 | 3 | 13 |
| 1 | 4.5 | 13 |
| 2 | 9 | 20 |

Figure 7B:
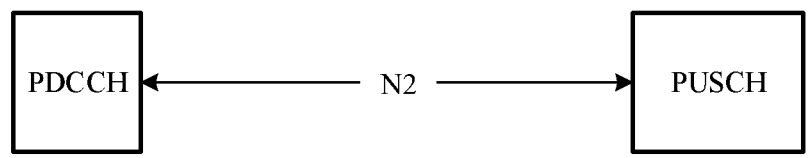
FIG. 7B is a schematic diagram of N2 according to an embodiment of this application.

(7.2). A preparation time of the terminal device for a physical uplink shared channel (physical uplink shared channel, PUSCH). The preparation time of the terminal device for the PUSCH is a time from a last symbol on which the terminal device receives a PDCCH including downlink control information (DCI) for scheduling the PUSCH to an allocated uplink symbol on which a first PUSCH is received. The DCI for scheduling the PUSCH is also referred to as uplink grant (UL grant) information, as shown in FIG. 7B. A basic part of the preparation time of the terminal device for the PUSCH may be represented by N2. N2 may be measured in units of symbols. A value of N2 varies with different numerologies. Refer to Table 8 and Table 9. Table 8 is used to describe values of N2 in different numerologies of a terminal device with a common processing capability. Table 9 is used to describe values of N1 in different numerologies of a terminal device with an enhanced processing capability.

TABLE 8

| μ | N2 [symbols] |
|---|---|
| 0 | 10 |
| 1 | 12 |
| 2 | 23 |
| 3 | 36 |

TABLE 9

| μ | N2 [symbols] |
|---|---|
| 0 | 5 |
| 1 | 5.5 |
| 2 | 11 |

(7.3) A CSI calculation time of the terminal device.

Figure 7C:
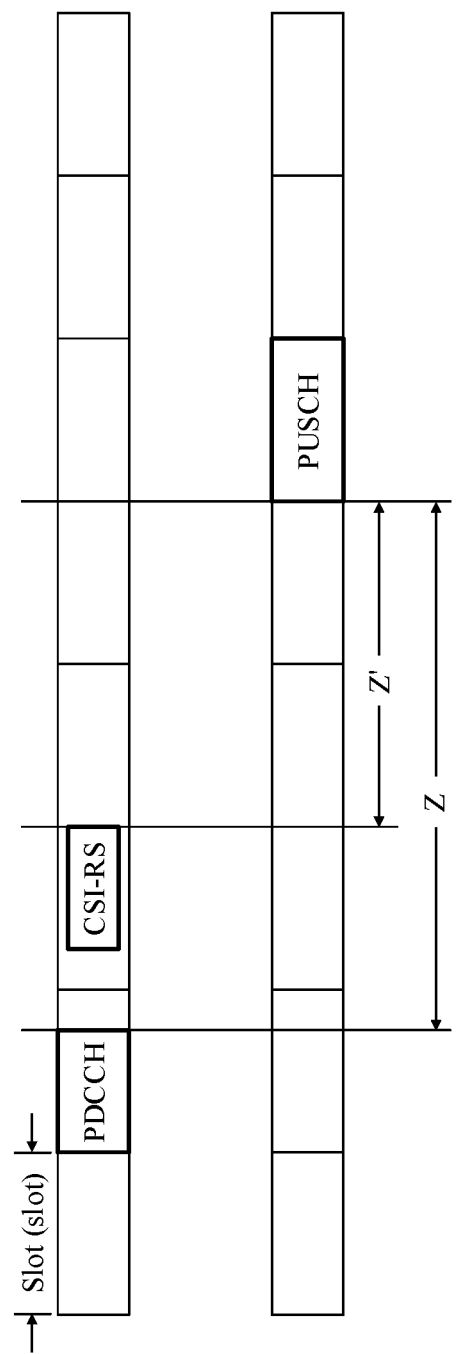
FIG. 7C is a schematic diagram of Z and Z' according to an embodiment of this application.

The CSI calculation time of the terminal device may be classified into two types, which are respectively represented by Z and Z'. A CSI calculation time is related to a numerology. For example, refer to Table 10. Table 10 shows values of Z and Z' corresponding to different numerologies when a CSI report (requirement 1) is triggered on a network side. As shown in FIG. 7C, Z represents a time interval between a last symbol of a PDCCH for triggering a CSI report and a first uplink symbol that carries the CSI report, and Z' represents a time interval between a last symbol used for CSI measurement and a first uplink symbol that carries the CSI report. The last symbol used for CSI measurement may be a last symbol of an asynchronous channel state information reference signal (CSI-RS) resource used for channel measurement, or a last symbol of a channel state information interference management (CSI-IM) resource used for interference measurement, or a last symbol of an asynchronous non-zero power (NZP) CSI-RS resource used for interference measurement.

TABLE 10

| | Z1 [symbols] | |
|---|---|---|
| μ | Z1 | Z'1 |
| 0 | 9 or 10 | 7 or 8 |
| 1 | 13 | 11 |
| 2 | 25 | 21 |
| 3 | 43 | 36 |

(7.4) Downlink HARQ timing.

Figure 7D:
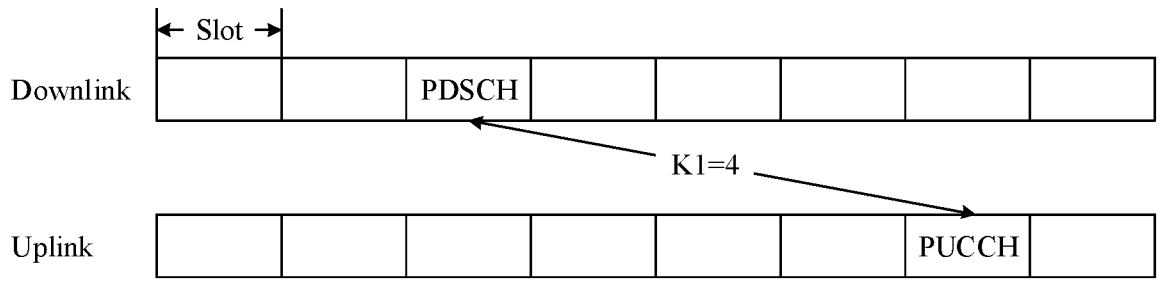
FIG. 7D is a schematic diagram of K1 according to an embodiment of this application.

A HARQ timing represents a time relationship between downlink sent data and HARQ feedback information corresponding to the data. During downlink data transmission, the network device sends data to the terminal device, and the terminal device performs HARQ feedback to the network device based on a receiving status of the data. If the terminal device correctly receives the data, the terminal device feeds back an ACK to the network device. If the terminal device does not correctly receive the data, the terminal device feeds back a NACK to the network device. In an LTE system, downlink HARQ timing duration of all terminal devices is four subframes. In an NR system, because different terminal devices have different processing capabilities, and resource scheduling in NR is more flexible than that in LTE, downlink HARQ timing duration in the NR system is configurable. The downlink HARQ timing duration may also be referred to as a downlink data HARQ feedback time (K1), and is a quantity of time units from when a downlink shared channel PDSCH is received to when corresponding HARQ feedback information is sent on a PUCCH or a PUSCH, and the time unit herein is a slot. The network device predefines a K1 set for the terminal device, or configures a K1 set by using RRC signaling. During downlink data scheduling, there is an indicator field (PDSCH-to-HARQ_feedback timing indicator) of a downlink data to a HARQ feedback time in DCI information, and the indicator field is used to indicate a value in a predefined K1 set or an RRC-configured K1 set. For example, if the K1 set is {1, 2, 3, 4}, and the indicator field of the downlink data to the HARQ feedback time in the DCI is 0, a first value in the K1 set is indicated, in other words, a value of K1 is 1. When the PDSCH-to-HARQ_feedback timing indicator is 3, it indicates that a fourth value in the K1 set is used, in other words, K1=4, as shown in FIG. 7D. The downlink HARQ timing duration configured by the network device for the terminal device is usually determined based on a processing time of the terminal device for the PDSCH. In other words, K1 is usually configured with reference to duration of N1. A time indicated by K1 usually should be greater than N1. When performing HARQ feedback on downlink data, the terminal device usually feeds back an ACK/NACK based on the value of K1 indicated by the network device. In other words, the value of K1 indirectly reflects the processing time of the terminal device for the PDSCH.

In addition, the K1 set is configured based on the BWP. To be specific, the network device may configure different K1 value sets for the terminal device on different downlink BWPs. Therefore, values of K1 on different BWPs in a same cell may be different, and values of K1 on downlink BWPs on different carriers may also be different. The value of K1 actually used on a carrier corresponds to a value of an activated BWP. K1 may be measured in units of slots.

(7.5) Uplink scheduling timing duration

The uplink scheduling timing duration refers to a time relationship between an uplink scheduling PDCCH and sent PUSCH data. During uplink data transmission, the network device sends a PDCCH to the terminal device, where the PDCCH carries a transmission parameter of a PUSCH. After receiving the PDCCH, the terminal device sends the PUSCH to the network device after uplink scheduling timing duration based on the parameter carried in the PDCCH.

Uplink scheduling timing duration of all terminal devices in LTE is a fixed value, to be specific, four subframes. In an NR system, because different terminal devices have different processing capabilities, and resource scheduling in NR is more flexible than that in LTE, uplink scheduling timing duration in the NR system is configurable. The uplink scheduling timing duration may also be referred to as an uplink data scheduling time configured for the terminal device. The uplink data scheduling time configured for the terminal device may be represented by K2. During configuration, the network device usually determines the uplink data scheduling time for the terminal device based on a preparation time of the terminal device for a PUSCH. In other words, K2 is usually configured with reference to duration of N2. A time indicated by K2 usually should be greater than N2. When sending uplink data, the terminal device sends the PUSCH based on a value of K2 indicated by the network device. In other words, the value of K2 indirectly reflects the preparation time of the terminal device for the PUSCH.

In addition, K2 is configured based on a BWP. To be specific, the network device may configure different K2 value sets for the terminal device on different BWPs, and K2 sets configured on BWPs in different cells may also be different. The value of K2 actually used in a cell corresponds to a value of an activated BWP. K2 may be measured in units of slots. Duration of each slot may be determined by using a numerology of a carrier on which scheduled data is located.

In the NR system, the network device predefines an uplink time domain allocation table for the terminal device, or configures, by using RRC signaling, an uplink time domain allocation table including at least one row. Each row of the table includes one value of K2, and values of K2 in all rows may be considered as a K2 set. Each row shown in Table 11 corresponds to one index value, and a PUSCH mapping type in Table 11 other than K2 is used to indicate a PUSCH time domain allocation type. Actually, the uplink time domain allocation table may include start time and length information of uplink data corresponding to each index. This is not shown in Table 11 in this embodiment of this application.

TABLE 11

| Index | PUSCH mapping type | K2 |
|---|---|---|
| 1 | Type A | 2 |
| 2 | Type A | 1 |
| 3 | Type B | 0 |
| 4 | Type B | 3 |

Figure 7E:
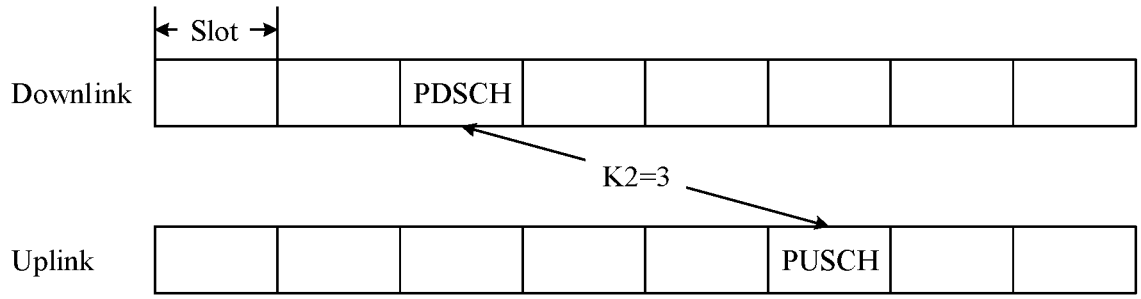
FIG. 7E is a schematic diagram of K2 according to an embodiment of this application.

Then, the network device uses an indicator field (time domain resource assignment) in downlink control information (DCI) used for uplink scheduling to indicate a row in a predefined or RRC-configured time domain allocation table. When a value of the indicator field is X, it indicates an $(X+1)^{th}$ row in the time domain allocation table. For example, when the time domain resource assignment is 0, it indicates that the first row of the uplink time domain allocation table is selected, and K2=2. For another example, when the time domain resource assignment is 3, it indicates that the fourth row of the uplink time domain allocation table is selected, and K2=3, as shown in FIG. 7E.

In addition, it should be noted that in this application, "a plurality of" refers to two or more than two. A mathematical symbol $\lfloor \rfloor$ in this embodiment of this application represents rounding down. For example, if A=3.9, $\lfloor A \rfloor$=3. A mathematical symbol $\lceil \rceil$ represents rounding up. For example, if B=3.1, $\lceil B \rceil$=4. In the descriptions of this application, terms such as "first" and "second" are merely used for distinguishing and description purposes, and should not be understood as indicating or implying relative importance, nor as indicating or implying a sequence.

Currently, in the LTE system, timing duration of SCell activation or deactivation is a fixed value, to be specific, eight subframes. When the terminal device receives an activation command for an SCell in a subframe n, the terminal device performs CSI reporting and an operation related to a deactivation timer (sCellDeactivationTimer) (starting or restarting the deactivation timer) in a subframe n+8, and after the subframe n+8 and before a subframe n+m that specified by a minimum activation latency counter requirement defined in the 3GPP protocol RAN4 TS.36.133, performs other activation operations, such as initiating PDCCH monitoring of the SCell and initiating SRS transmission. m is a positive integer greater than 8. For example, m may be equal to 24 subframes.

When the terminal device receives a deactivation command in the subframe n or determines that a deactivation timer of an SCell times out, the terminal device does not report a CSI report of a deactivated cell in the subframe n+8, and completes another deactivation operation, for example, stops sending uplink data or stops sending an SRS, no later than arrival of the subframe n+p. For example, p may be equal to 7.

In the NR system, to adapt to transmission of data of different service types, a time unit of data scheduling is flexibly changed. Therefore, activation or deactivation timing duration also needs to be flexibly changed. In different service types, some service types have high requirements on latencies and some have low requirements on latencies. Therefore, the NR system uses time units of different granularities for data scheduling. For example, referring to Table 4, for an SCS whose frame structure parameter index μ is equal to 2, that is, an SCS of 60 kHz, one subframe includes four slots, and duration of one subframe is 1 ms. Therefore, a length of one slot is 1 ms±4=0.25 ms. In a case of a normal CP, one slot includes 14 symbols. Therefore, duration of one OFDM symbol is 0.25 ms±14=0.018 ms. When one slot is used as a time unit of scheduling, one data packet can be sent every 0.25 ms. When two OFDM symbols are used as a time unit of scheduling, one data packet can be scheduled every 0.036 ms. Carriers scheduled in different time units have different requirements for activation and deactivation. Therefore, applying the fixed 8 subframes (corresponding to 8 ms) in LTE to the NR system wastes time resources. As a result, using the fixed 8 subframes (corresponding to 8 ms) in LTE as the timing duration of activation or deactivation is no longer applicable to a flexible scheduling case in the NR system.

Based on this, the embodiments of this application provide a secondary cell control method and an apparatus, to resolve a prior-art problem that using 8 ms as timing duration for activation or deactivation in an NR system is a waste of time resources. The method and the apparatus are based on a same inventive concept. Because problem-resolving principles of the method and the apparatus are similar, mutual reference may be made to implementations of the apparatus and the method, and repeated parts are not described again.

Figure 8:
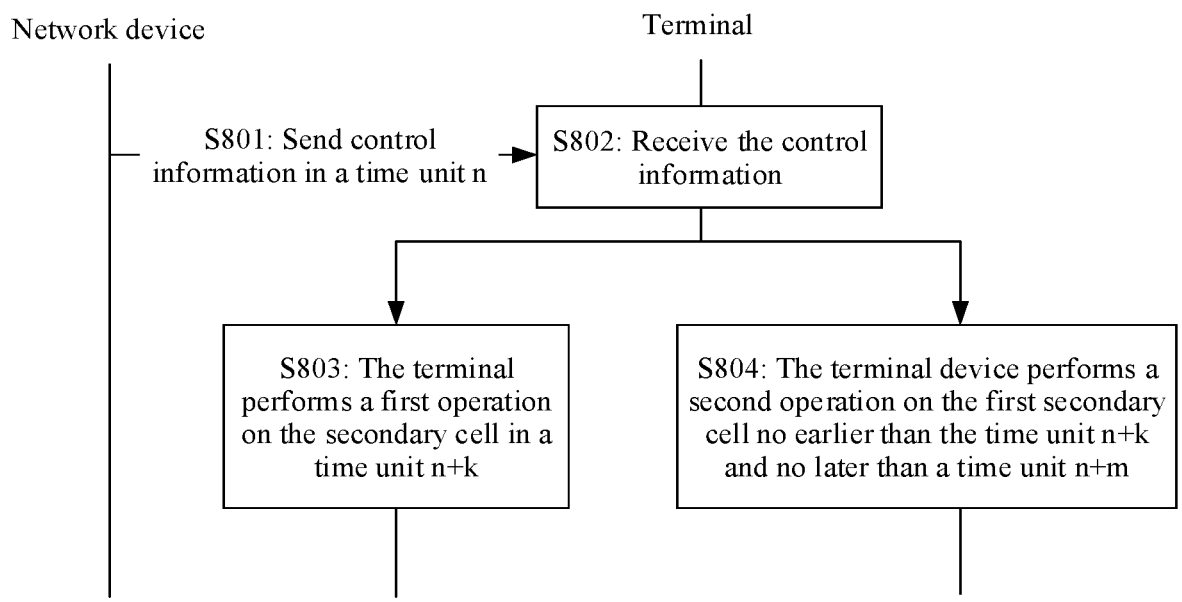
FIG. 8 is a schematic flowchart of a secondary cell control method according to an embodiment of this application.

FIG. 8 is a schematic flowchart of a secondary cell control method according to an embodiment of this application. In this embodiment of this application, an apparatus for performing the secondary cell control method may be a terminal device, or may be another apparatus that can support a terminal device in implementing the method described in this embodiment of this application, for example, may be an apparatus disposed in the terminal device. The apparatus disposed in the terminal device may be a chip system, a module, a circuit, or the like. This is not specifically limited in this application. In this embodiment of this application, a terminal device may be used as an example for description.

S801: A network device sends control information to the terminal device in a time unit n.

S802: The terminal device receives the control information in the time unit n.

For example, the terminal device may receive the control information in the time unit n in a PCell, or may receive the control information in the time unit n in another activated SCell. In other words, a cell for transmitting the control information may be any one of activated serving cells.

The control information may include an activation command for a first secondary cell, or the control information may include a deactivation command for a first secondary cell.

For example, the control information may be a MAC CE, for example, a MAC CE structure shown in FIG. 3 or FIG. 4.

When the terminal device receives the control information in the time unit n, the terminal device identifies one or more secondary cells to be activated/deactivated. The control information may include one or more cell activation commands, or the control information may include one or more cell deactivation commands, or the control information may include one or more cell activation commands or one or more cell deactivation commands. In this embodiment of this application, activation or deactivation of one secondary cell (the first secondary cell) is used as an example. When an activation command or a deactivation command for another secondary cell is included, a process of activation or deactivation of the another secondary cell is similar to that of the first secondary cell, and details are not described again.

In this embodiment of this application, for ease of description, another secondary cell is collectively referred to as a second secondary cell, and there may be one or more second secondary cells. For example, if there is one second secondary cell, on the basis of including an activation command or a deactivation command for the first secondary cell, the control information may further include an activation command or a deactivation command for the second secondary cell. When there are two second secondary cells, on the basis of including an activation command or a deactivation command for the first secondary cell, the control information may further include activation commands respectively corresponding to the two second secondary cells, or an activation command for one second secondary cell and a deactivation command for the other second secondary cell, or deactivation commands for the two second secondary cells. Alternatively, there may be three or more second secondary cells.

After the terminal device receives the control information in the time unit n in step S802, if the control information includes an activation command for the first secondary cell, in a first possible case, S803 is performed. In a second possible case, S804 is performed.

S803: The terminal device performs a first operation on the first secondary cell in a time unit n+k.

In a possible implementation, the first operation for the first secondary cell may be sending first information. In other words, S803 is that the terminal device reports and sends first information of the first secondary cell in a time unit n+k. The first information may be a CSI report.

In another possible implementation, the first operation for the secondary cell may alternatively be starting a deactivation timer of the first secondary cell, or restarting a deactivation timer of the first secondary cell.

S804: The terminal device performs a second operation on the first secondary cell no earlier than the time unit n+k and no later than a time unit n+m.

m may be a time required by a minimum activation latency indicator defined in the 3GPP protocol RAN4 TS.36.133. For example, m may be equal to 24.

In a possible implementation, the second operation for the first secondary cell may include but is not limited to at least one of the following:
 sending SRS information on the first secondary cell;
 sending a PUCCH on the first secondary cell;
 monitoring a PDCCH on the first secondary cell; or
 monitoring a PDCCH for scheduling the first secondary cell.

In a possible implementation, after the terminal device receives the control information in the time unit n in step S802, if the control information includes a deactivation command for the first secondary cell, in a third possible case, a time unit n+k is not used to transmit first information of the first secondary cell. In a fourth possible case, the terminal device may perform a third operation on the first secondary cell no later than a time unit n+p. For example, p may be equal to 7.

For example, the third operation for the first secondary cell may include but is not limited to at least one of the following:
 not monitoring a PDCCH on the first secondary cell;
 not monitoring a PDCCH for scheduling the first secondary cell;
 not transmitting an SRS in the first secondary cell;
 not transmitting uplink data in the first secondary cell;
 not transmitting an uplink control channel PUCCH in the first secondary cell;
 stopping a deactivation timer of the first secondary cell; or
 clearing a HARQ buffer corresponding to the first secondary cell.

In addition, in this embodiment of this application, k is determined based on a first frame structure parameter configured for the terminal device, and both n and k are positive integers.

The first frame structure parameter is a frame structure parameter of a BWP of the terminal device in a secondary cell. In a cell, the network device may configure a plurality of BWPs (for example, a maximum of four BWPs in the uplink and a maximum of four BWPs in the downlink) for the terminal device in the uplink or downlink. Each BWP is independently configured with a numerology, and different BWPs may be configured with a same numerology or different numerologies. The network device may activate only one of the plurality of uplink or downlink BWPs for the terminal device, and the terminal device can receive or send data only on an activated BWP. For the terminal device, a frame structure parameter corresponding to a cell in this embodiment of this application is a frame structure parameter corresponding to an activated BWP of the terminal device in the cell.

As described above, in this embodiment of this application, the control information may include one or more cell activation commands, or the control information may include one or more cell deactivation commands, or the control information may include one or more cell activation commands or one or more cell deactivation commands.

When the control information includes only the activation command or the deactivation command for the first secondary cell, an index of the first frame structure parameter may be a frame structure parameter index of the first secondary cell, or may be a smallest value in frame structure parameter indexes of cells that are configured for the terminal device, or may be a smaller value in a frame structure parameter index corresponding to a cell used to transmit the control information and a frame structure parameter index corresponding to the first secondary cell.

When the control information includes the activation command or the deactivation command for the first secondary cell and further includes an activation command or a deactivation command for a second secondary cell, an index of the first frame structure parameter may be any one of (a), (b), (c), and (d), or a combination thereof. As shown above, a quantity of cells included in the second secondary cell is not specifically limited in this application.

(a) is a smaller value in the frame structure parameter index of the first secondary cell and a frame structure parameter index of the second secondary cell.

For example, the frame structure parameter index μ of the first secondary cell is equal to μ1, and the frame structure parameter index μ of the second secondary cell is equal to μ2. When there are a plurality of second secondary cells, μ2=min(values of u of all the second secondary cells), and an index value μ of the first frame structure parameter is equal to min(μ1, μ2). In other words, a time unit with a relatively large time granularity is used during determining of the processing time.

(b) is a smallest value in frame structure parameter indexes of cells that are configured for the terminal device.

(c) is a smallest value in the frame structure parameter index of the first secondary cell, a frame structure parameter index of the second secondary cell, and a frame structure parameter index of a cell used to transmit the first information.

For example, if the frame structure parameter index μ of the first secondary cell is equal to μ1, the frame structure parameter index μ of the second secondary cell is equal to μ2, and the frame structure parameter index μ of the cell used to transmit the first information is equal to μ3, the index value μ of the first frame structure parameter is equal to min(μ1, μ2, μ3).

(d) is a frame structure parameter with a smaller index value in a second frame structure parameter and a frame structure parameter that corresponds to a cell used to transmit the control information. When the control information further includes the activation command or the deactivation command for the second secondary cell, the second frame structure parameter is a frame structure parameter with a smaller index value in the frame structure parameter corresponding to the first secondary cell and a frame structure parameter corresponding to the second secondary cell.

The foregoing frame structure parameter may be an uplink frame structure parameter, or may be a downlink frame structure parameter. For example, (a), (b), and (c) are uplink frame structure parameters, and the frame structure parameter for transmitting control information in (d) may be a downlink control parameter. An activated cell or a deactivated cell corresponds to an uplink frame structure parameter.

It should be noted that, in this embodiment of this application, a subcarrier spacing of a scheduling carrier is less than a subcarrier spacing of a scheduled carrier, and this may also be expressed as that an index value of a frame structure parameter of a scheduling carrier is less than an index value of a frame structure parameter of a scheduled carrier. It can be learned from Table 1 that the two have a same meaning. A slot in this embodiment of this application may also be expressed as a time domain unit. In a case of a normal CP, one slot includes 14 orthogonal frequency division multiplexing (OFDM) symbols. In an extended CP, one slot includes 12 OFDM symbols (or symbols for short). It may be understood that, in another embodiment, one slot may alternatively include another quantity of symbols. This is not specifically limited.

It should be noted that the time unit in this embodiment of this application may be a subframe, a mini-subframe, a slot, a mini-slot, an orthogonal frequency division multiplexing (OFDM) symbol, a time unit smaller than an OFDM symbol, or a time unit larger than a subframe. This is not limited in this application.

In the foregoing solution, the terminal device determines a value of k based on a frame structure parameter configured by the network device for the terminal device, that is, different frame structure parameters correspond to different values of k, so that a time required for controlling activation or deactivation of the secondary cell is flexibly determined, and a waste of time resources caused by fixed 8 ms can be avoided.

In this embodiment of this application, in one manner, a correspondence between the frame structure parameter and a time unit k is configured on the terminal device. For example, the correspondence includes an index μ of the frame structure parameter and the corresponding time unit k, so that the terminal device determines the time unit k based on the frame structure parameter index indicated by the network device and the correspondence. In another manner, the correspondence is not configured on the terminal device. In this case, the terminal device determines the time unit k based on the frame structure parameter indicated by the network device and a configuration rule.

In a possible example, that k is determined based on the first frame structure parameter configured for the terminal device may include: k is determined based on a processing time, and the processing time may be determined based on at least one of the following (1), (2), (3), (4), (5), and (6):

(1) is a processing time of the terminal device for a PDSCH. The processing time of the terminal device for the PDSCH is determined based on the first frame structure parameter. For related descriptions of the processing time of the terminal device for the PDSCH, refer to the foregoing description in (7.1). Details are not described herein again. As described above, the processing time of the terminal device for the PDSCH may be represented by N1. N1 is measured in units of symbols. When indexes μ of different frame structure parameters are set to different values, a value of N1 corresponding to a common processing capability and a DMRS configuration 2 (an additional DMRS configuration) may be selected.

(2) is a preparation time of the terminal device for a PUSCH. The preparation time of the terminal device for the PUSCH is determined based on the first frame structure parameter. For related descriptions of the preparation time of the terminal device for the PUSCH, refer to the foregoing description in (7.2). Details are not described herein again. As described above, the preparation time of the terminal device for the PUSCH may be represented by N2. N2 is measured in units of symbols. When indexes μ of the frame structure parameters are set to different values, a value of N2 corresponding to a common processing capability may be selected.

(3) is a downlink data HARQ feedback time configured for the terminal device.

The downlink data HARQ feedback time is a quantity of time units from when a downlink shared channel PDSCH is received to when corresponding HARQ feedback information is sent on a PUCCH or a PUSCH. The downlink data HARQ feedback time is determined based on the first frame structure parameter. For related descriptions of the downlink data HARQ feedback time, refer to the foregoing description in (7.4). Details are not described herein again. As described above, the downlink data HARQ feedback time may be represented by K1.

N1 represents the processing time of the terminal device for the PDSCH from a perspective of a capability of the terminal device. K1 is a downlink data HARQ feedback time configured for the terminal device, and is configured based on N1. In this case, if N1 is used during determining of the processing time, K1 may not be considered. If K1 is used during determining of the time, N1 may not be considered. K1 is measured in units of slots.

The downlink data HARQ feedback time may be preconfigured or predefined on the terminal device, or may be configured by the network device by using signaling. The signaling may be semi-persistent signaling and/or dynamic signaling.

In this embodiment of this application, the semi-persistent signaling may be radio resource control (RRC) signaling, a broadcast message, a system message, or a medium access control (MAC) control element (CE). The broadcast message may include remaining minimum system information (RMSI).

In this embodiment of this application, the dynamic signaling may be physical layer signaling. The physical layer signaling may be signaling carried on a physical control channel or signaling carried on a physical data channel. The physical control channel may be a physical downlink control channel (PDCCH), an enhanced physical downlink control channel (EPDCCH), a narrowband physical downlink control channel (NPDCCH), or a machine type communication (MTC) physical downlink control channel (MPDCCH). Signaling carried on the PDCCH or the EPDCCH may also be referred to as downlink control information (DCI). The physical control channel may alternatively be a physical sidelink control channel, and signaling carried on the physical sidelink control channel may also be referred to as sidelink control information (SCI).

(4) is a CSI calculation time of the terminal device. The CSI calculation time of the terminal device is determined based on the first frame structure parameter. The CSI calculation time of the terminal device may be Z or Z'. For related descriptions of the CSI calculation time of the terminal device, refer to the foregoing description in (7.3). Details are not described herein again. Z or Z' is measured in units of symbols. When indexes μ of the frame structure parameters are set to different values, a smaller value of corresponding Z1 and Z1' may be selected.

(5) is an uplink data scheduling time configured for the terminal device.

The uplink data scheduling time is a difference between a quantity of time units in which uplink scheduling control information is sent and a quantity of time units in which uplink data is sent. The uplink data scheduling time is determined based on the first frame structure parameter.

For related descriptions of the uplink data scheduling time, refer to the foregoing description in (7.5). Details are not described herein again. As described above, the uplink data scheduling time may be represented by K2.

N2 represents the preparation time of the terminal device for the PUSCH from a perspective of a capability of the terminal device. K2 is an uplink data scheduling time configured for the terminal device, and is configured based on N2. In this case, if N2 is used during determining of the processing time, K2 may not be considered. If K2 is used during determining of the time, N2 may not be considered. K2 is measured in units of slots.

(6) is a preparation time of the terminal device for a CSI report. The preparation time of the terminal device for the CSI report is determined based on the first frame structure parameter. For ease of description, the preparation time of the terminal device for the CSI report is referred to as T1. T1 may be a separate processing time, and a unit of the time may be an absolute time, or may be a time in units of slots or symbols. For example, T1 may be eight symbols when μ is equal to 0. Alternatively, T1 may be determined based on N2, Z, Z', or K2. N2 represents a preparation time of the terminal device for data of a PUSCH from a perspective of a capability of the terminal device, and the PUSCH can be used to carry CSI. Therefore, N2 indirectly represents the preparation time of the terminal device for the CSI report. In the foregoing case, if T1 is used during determining of the processing time, the time described in (2) and (3) may no longer be used.

In an example, T1 may be equal to N2×A1, and A1 represents a scale factor. A1 is less than 1.

In an example, T1 may alternatively be equal to Z' (or Z)×A2, and A2 is less than 1.

In an example, T1 may alternatively be equal to K2×A3, and A3 is less than 1.

For example, T3 may alternatively be determined based on a preparation time for OOR CSI. Before the secondary cell is activated, the terminal device does not need to measure the secondary cell. Therefore, content included in the prepared CSI report may not be valid content. Usually, the CSI report may include at least one of the following content:

a channel quality indicator (CQI), a precoding matrix indicator (PMI), a CSI-RS resource indicator (CRI), a synchronized broadcast block resource indicator (SS/PBCH block Resource indicator, SSBRI), a layer indicator (LI), or physical layer reference signal received power (layer 1 reference signal received power, L1-RSRP). The SS represents a synchronization signal. The PBCH represents a physical broadcast channel.

The CQI information is shown in Table 12. When there is no valid CQI information, content of CQI index=0 may be fed back, indicating that the CQI information is out of range (OOR). When the CQI information is OOR, the CSI may be referred to as OOR CSI. In T3, the terminal device only needs to perform PUCCH or PUSCH encoding on the prepared CSI information, and then feed back the prepared CSI information based on a location of a feedback resource. In Table 12, QPSK represents quadrature phase shift keying, and QAM represents quadrature amplitude modulation.

TABLE 12

| CQI Index | Modulation | Encoding rate (code rate × 1024) | Efficiency |
| --- | --- | --- | --- |
| 0 | | Out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |

TABLE 12-continued

| CQI Index | Modulation | Encoding rate (code rate × 1024) | Efficiency |
|---|---|---|---|
| 13 | 64QAM | 772 | 4.5234 |
| 14 | 64QAM | 873 | 5.1152 |
| 15 | 64QAM | 948 | 5.5547 |

A time of N2 includes a time within which the terminal device obtains data from an upper layer, performs PUSCH encoding on the data, and then waits for sending of a PUSCH. A time of Z includes a time from when CSI reporting is triggered by a PDCCH to when the terminal device performs CSI-RS measurement, performs PUSCH encoding on a measurement result, and then waits for sending of the PUSCH. A time of Z' includes a time within which the terminal device performs CSI-RS measurement, performs PUSCH encoding on a measurement result, and then waits for sending of the PUSCH. All of these times are longer than the preparation time of the terminal device for the OOR CSI report. Before the secondary cell is activated, the terminal device does not need to measure the secondary cell. Therefore, content included in the prepared CSI report may not be valid content, and the preparation time of the terminal device for the OOR CSI report is only a part of the time of N2, Z, or Z'. Therefore, in this embodiment of this application, selecting the preparation time of the terminal device for the OOR CSI report as T1 to determine timing duration of activation or deactivation of the secondary cell can further save a time resource.

The preparation time of the terminal device for the OOR CSI report may include a time within which the selected CQI is 0, the corresponding CQI information is out of range, the CSI report is generated, PUSCH or PUCCH encoding has been performed on the CSI report, and then the terminal device waits for sending of the PUSCH or the PUCCH. The preparation time of the terminal device for the OOR CSI report may be obtained by performing measurement based on the foregoing procedure.

In addition, in this embodiment of this application, when the processing time of the terminal device meets Z and Z', the terminal device may feed back a valid CSI report.

In a possible example, the processing time may be determined based on at least one of the following (7), (8), (9), (10), and (11) in addition to at least one of the foregoing (1), (2), (3), (4), (5), and (6). In other words, the processing time may be determined based on a time parameter. The time parameter may include at least one of (1), (2), (3), (4), (5), and (6), and the time parameter may further include at least one of (7), (8), (9), (10), and (11).

(7) is a processing time of the terminal device for a MAC layer. For ease of description, the processing time of the terminal device for the MAC layer is referred to as T2. T2 is a time within which the terminal device parses content of a MAC CE at the MAC layer. To be specific, after successfully decoding the PUSCH, the terminal device determines, in a MAC PDU, a location of the MAC CE used to activate or deactivate a secondary cell, and parses the location, to determine which secondary cell needs to be activated or which cell needs to be deactivated. For example, a value of T2 may be 0.5 ms.

For example, using a structure of the MAC PDU shown in FIG. 5 as an example, a MAC CE that is in the MAC PDU and that is used to activate or deactivate the first secondary cell is a MAC CE 1. For example, a structure of the MAC CE 1 is the MAC CE structure shown in FIG. 3. In this case, a location of C3 in the MAC CE 1 shown in FIG. 3 is used to indicate to activate the first secondary cell. Therefore, the processing time of the terminal device for the MAC layer may include a time within which the terminal device determines the MAC CE 1 in the MAC PDU, and a time within which the terminal device determines that the location of C3 obtained through parsing from the MAC CE 1 corresponds to the first secondary cell and that an indication value is 1.

(8) is a radio frequency adjustment time of the terminal device. For ease of description, the radio frequency adjustment time of the terminal device is referred to as T3. T3 is a time within which the terminal device enables a radio frequency channel, switches a radio frequency channel, or disables a radio frequency channel. A unit of the time of T3 may be an absolute time, or may be a time in units of slots or symbols. For example, a value of T3 may be 10 μs.

(9) is a preparation time or an end time for the terminal device to perform baseband processing on the first secondary cell. For ease of description, the preparation time or the end time for the terminal device to perform baseband processing on the first secondary cell is referred to as T4. A unit of the time of T4 may be an absolute time, or may be a time in units of slots or symbols. For example, a value of T4 may be 50 μs.

The preparation time for the terminal device to perform baseband processing may include a time for powering on a baseband processing chip of the terminal device, starting a clock source, initializing various configurations, or the like.

(10) is a time difference for the terminal device to send signals in different cells. For ease of description, in this embodiment of this application, the time difference for the terminal device to send signals in different cells is referred to as T5. A unit of the time of T5 may be an absolute time, or may be a time in units of slots or symbols.

Considering that different serving cells (including SCells and PCells) may have different locations relative to the terminal device, when TA adjustment is not considered, time points at which signals sent by the terminal device by using different cells reach the network device may also be different. Therefore, in a carrier aggregation scenario, to enable signals sent by the terminal device in different cells (on different carriers) to reach the network device at the same time, there is a time difference between the signals sent by the terminal device in the different cells. The time difference is T5, and may also be referred to as a timing time difference between cells (carriers). Currently, one cell has only one downlink carrier. Therefore, in this application, the cell and the carrier are sometimes used interchangeably, and no special distinction is made.

(11) is a time difference for the terminal device to receive signals in different cells. For ease of description, in this embodiment of this application, the time difference for the terminal device to receive signals in different cells is referred to as T6.

Figure 9A:
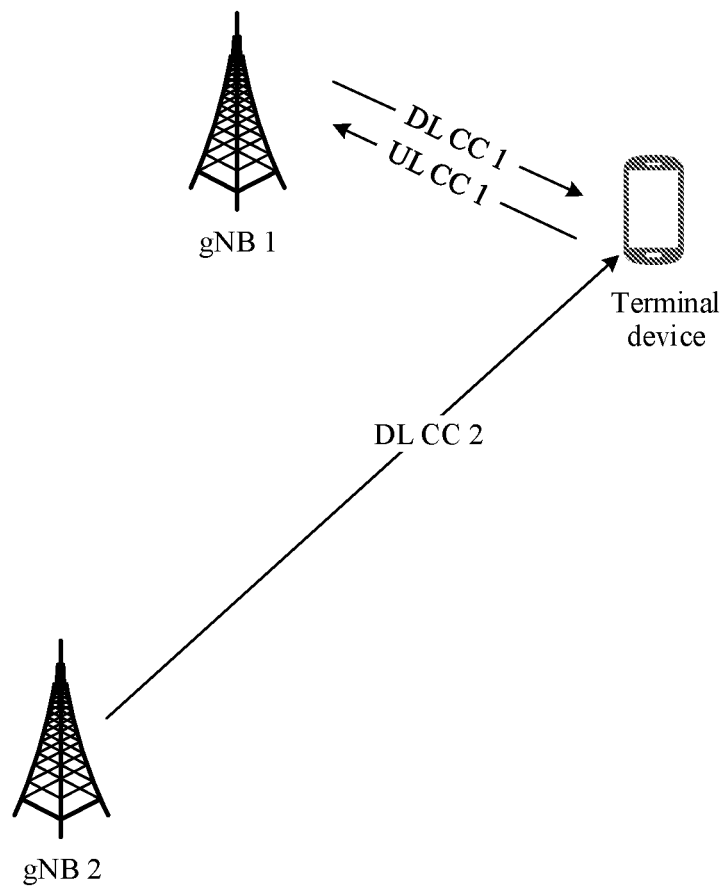
FIG. 9A is a schematic architectural diagram of a communications system in a carrier aggregation scenario according to an embodiment of this application.
Figure 9B:
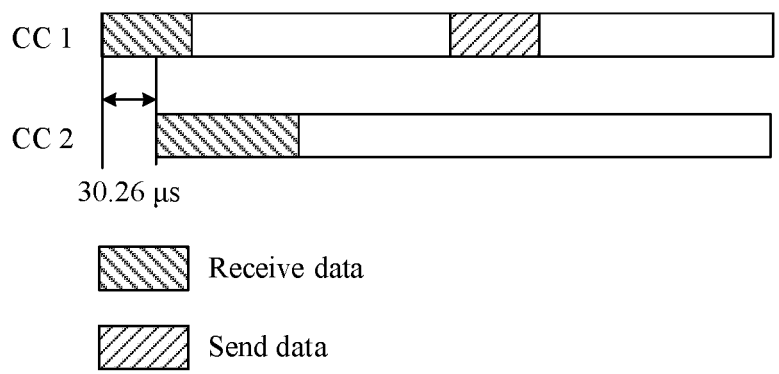
FIG. 9B is a schematic diagram of T6 according to an embodiment of this application.

As shown in FIG. 9A and FIG. 9B, a DL CC 1 is a downlink carrier located on a network device gNB 1, and a DL CC 2 is a downlink carrier located on the gNB 2. The UL CC 1 is an uplink carrier located on the gNB 1. Because distances from the gNB 1 and the gNB 2 to the terminal device are different, time points at which signals sent from the different gNBs reach the terminal device are also different. As shown in FIG. 9A and FIG. 9B, the gNB 1 is close to the terminal device. Therefore, a signal from the gNB 1 reaches the terminal device (30.26 μs as shown in FIG. 9A and FIG. 9B) earlier than a signal from the gNB 2. A specific time of signal transmission from the gNB to the terminal device (or from the terminal device to the gNB) is related to a distance between the gNB and the terminal device and a propagation speed of an electromagnetic wave, and t=S÷v. S represents the distance between the gNB and the terminal device, and v represents the propagation speed of the electromagnetic wave 3×10^8 m/s. It can be deduced from the time difference of 30.26 µs that a difference between the distances from the gNB 1 and the gNB 2 to the terminal device is ΔS=30.26 µs×3×10^8 m/s=9.1 km. Because downlink data sent on different carriers reaches the terminal device at different time points, and uplink data needs to be sent on a same carrier, processing times of the terminal device for data sent on different downlink carriers are different. Therefore, considering the processing time of the terminal device in CA, a time difference in different cells (corresponding to different carriers) may be additionally added.

In an example, the processing time is determined in the following manner:

$$\text{Processing time} = \Sigma_i^d Y_i \times LT_i$$

$LT_i$ represents an $i^{th}$ time parameter. $Y_i$ represents a weighted value corresponding to the $i^{th}$ time parameter. Weighted values corresponding to different time parameters may be the same or different. d represents a quantity of selected time parameters. A value of $Y_i$ may be less than or equal to 1.

In an example, the time parameters used to determine the processing time may include N1, T1, and T2. For example, the processing time may be equal to N1+T1+T2. Alternatively, the processing time may be equal to Y1×N1+Y2×T1+Y3×T2.

In an example, during determining of the processing time, impact of a time of T6 is further considered in addition to N1, T1, and T2. In this case, the time parameters used to determine the processing time may include N1, T1, T2, and T6. For example, the processing time may be equal to T1+T2+T3+T6. Alternatively, the processing time may be equal to Y1×N1+Y2×T1+Y3×T2+Y4×T5.

In an example, the time parameters used to determine the processing time may include K1, T1, T2, and T3. For example, the processing time may be equal to K1+T1+T2+T3. Alternatively, the processing time may be equal to Y1×K1+Y2×T1+Y3×T2+Y4×T3.

In an example, the time parameters used to determine the processing time may include N1 (or K1), T1, T2, T3, T4, and T5. For example, the processing time may be equal to N1 (K1)+T1+T2+T3+T4+T5. Alternatively, the processing time may be equal to Y1×N1 (K1)+Y2×T1+Y3×T2+Y4×T3+Y5×T4+Y6×T5.

It should be noted that the foregoing calculation is an example of parameter selection, and a unified time unit needs to be considered during actual calculation.

In this embodiment of this application, when the time unit is a slot, that is, when k slots are determined based on the processing time, a first possible manner is to perform alignment in an absolute time, and a second possible manner is to perform alignment by using a symbol.

In the first possible manner in which the time unit is a slot, when alignment is performed by using an absolute time, all the time parameters used to determine the processing time may be converted into parameters measured in absolute times. For example, when the time parameters for determining the processing time include K2, and K2 is usually measured in slots, the slot is first converted into duration corresponding to the slot. In the foregoing manner, the processing time is determined by using the time parameters that are all measured in absolute times, and then the processing time is converted to k measured in slots.

k measured in slots meets the following condition:

$$k = \text{ceil}(N_{slot}^{subframe,\mu} \times T_{absolute\ time} \div T_{sf}); \text{ or}$$

$$k = \lceil N_{slot}^{subframe,\mu} \times T_{absolute\ time} \div T_{sf} \rceil.$$

$T_{absolute\ time}$ represents a value of the processing time measured in an absolute time, $N_{slot}^{subframe,\mu}$ represents a quantity of slots included in a subframe corresponding to the first frame structure parameter, ceil(x) returns a minimum integer greater than or equal to x, and $T_{sf}$ represents duration of the subframe.

In the second possible manner in which the time unit is a slot, when alignment is performed by using a symbol, all the time parameters used to determine the processing time may be converted into parameters measured in symbols. For example, when the time parameters for determining the processing time include K2, and K2 is usually measured in slots, the slot is first converted into a quantity of symbols corresponding to the slot. In the foregoing manner, the processing time is determined by using the time parameters that are all measured in symbols, and then the processing time is converted to k measured in slots.

k measured in slots meets the following conditions:

$$k = \text{ceil}(T_{symbols} \div N_{symbols}^{slot}); \text{ or}$$

$$k = \lceil T_{symbols} \div N_{symbols}^{slot} \rceil.$$

$N_{symbols}^{slot}$ represents a quantity of symbols included in one slot, $T_{symbols}$ represents a value of the processing time measured in symbols, and ceil(x) returns a minimum integer greater than or equal to x.

Figure 10A:
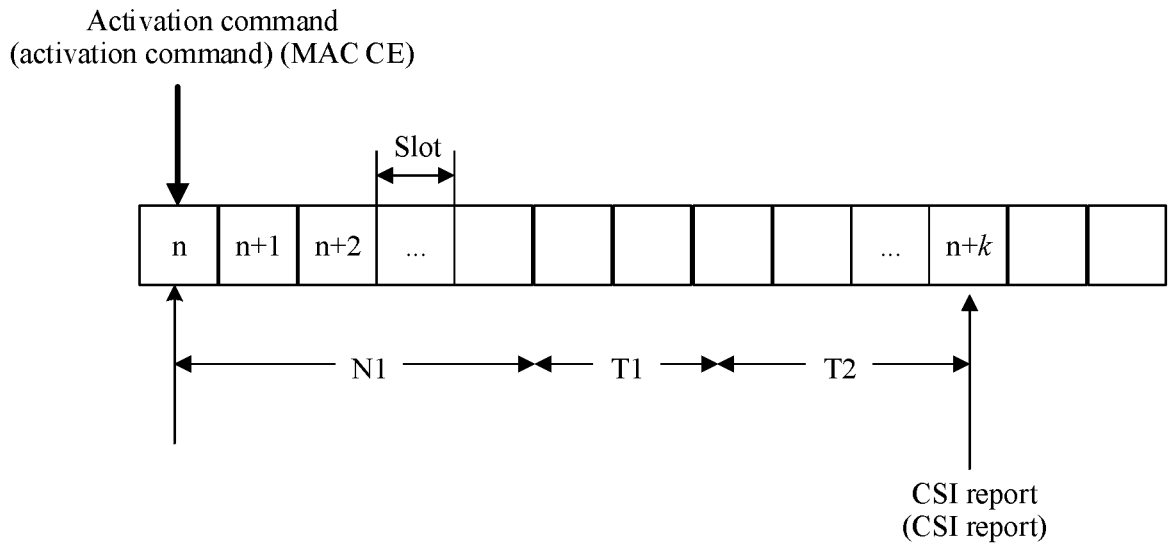
FIG. 10A is a schematic diagram showing that a time unit is a slot according to an embodiment of this application.

For example, as shown in FIG. 10A, in an example in which the processing time is equal to N1+T1+T2, the network device sends control information to the terminal device in a slot n of the PCell, so that the terminal device receives the control information in the slot n, and the terminal device performs the first operation on the secondary cell in a slot n+k.

In this embodiment of this application, when the time unit is a symbol, that is, when k symbols are determined based on the processing time, a first possible manner is to perform alignment by using an absolute time, and a second possible manner is to perform alignment by using a symbol.

In the first possible manner in which the time unit is a symbol, when alignment is performed by using an absolute time, all the time parameters used to determine the processing time may be converted into parameters measured in absolute times. For example, when the time parameters for determining the processing time include K2, and K2 is usually measured in slots, the slot is first converted into duration corresponding to the slot. In the foregoing manner, the processing time is determined by using the time parameters that are all measured in absolute times, and then the processing time is converted to k measured in symbols.

k measured in symbols meets the following conditions:

$$k = \text{ceil}(T_{absolute\ time} \div T_{symbol\ duration}); \text{ or}$$

$$k = \lceil T_{absolute\ time} \div T_{symbol\ duration} \rceil.$$

$T_{absolute\ time}$ represents a value of the processing time measured in an absolute time, ceil(x) returns a minimum integer greater than or equal to x, and $T_{symbol\ duration}$ represents duration of a symbol corresponding to the first frame structure parameter.

In addition, $T_{symbol\ duration} = (2018+144) \times \Gamma \times 2^{-\mu*} \times T_c$. $T_c = 1 \div (\Delta f_{max} \cdot N_f)$, where $\Delta f_{max} = 480 \cdot 10^3$ Hz, $N_f = 4096$, $\sigma=T_s \div T_c$, $T_s=1 \div (\Delta f_{ref} \cdot N_{f,ref})$, $\Delta f_{ref}=15 \cdot 10^3$ Hz, and $N_{f,ref}=2048$. Alternatively, $T_{symbol\ duration} = N_{slot}^{subframe,\mu} \div N_{symb}^{slot}$.

$T_c$ and $T_s$ each represent a minimum time unit of FFT digital calculation at a physical layer. $T_s$ corresponds to a minimum time unit of 2048-point FFT, and $T_c$ corresponds to a minimum time unit of 4096-point FFT. Therefore, $\Gamma=64$ is calculated.

In the second possible manner in which the time unit is a symbol, when alignment is performed by using a symbol, all the parameters used to determine the processing time are converted into parameters measured in symbols, and the determined processing time is k.

Figure 10B:
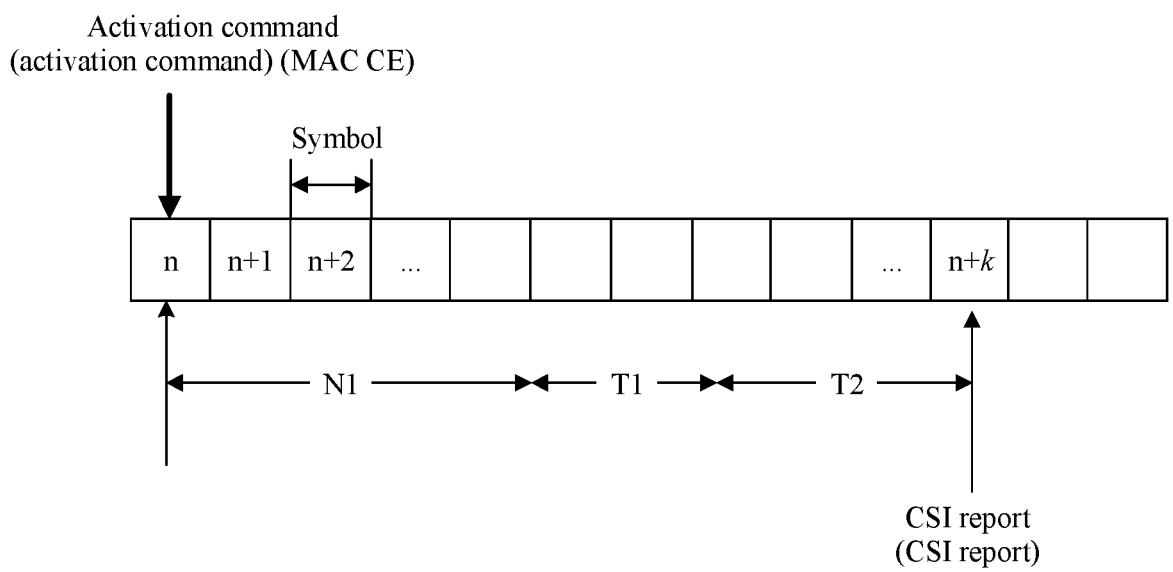
FIG. 10B is a schematic diagram showing that a time unit is a symbol according to an embodiment of this application.

For example, as shown in FIG. 10B, in an example in which the processing time is equal to N1+T1+T2, the network device sends control information to the terminal device on a symbol n of the PCell, so that the terminal device receives the control information on the symbol n, and the terminal device performs the first operation on the secondary cell on a symbol n+k.

In the foregoing embodiments provided in this application, the method provided in the embodiments of this application is separately described from perspectives of a network device, a terminal, and interaction between a network device and a terminal. To implement functions in the methods provided in the embodiments of this application, the network device and the terminal each may include a hardware structure and/or a software module, and implement the foregoing functions in a form of a hardware structure, a software module, or a hardware structure plus a software module. Whether a function in the foregoing functions is performed in a hardware structure, a software module, or a hardware structure plus a software module depends on a specific application and design constraint condition of the technical solution.

Figure 11:
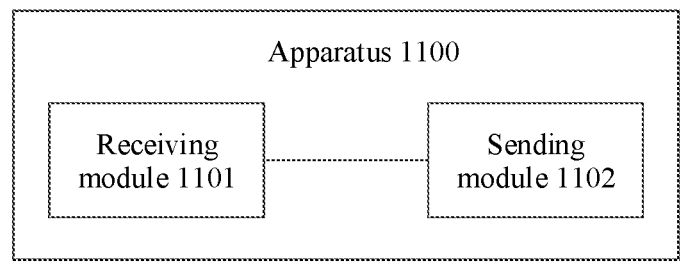
FIG. 11 is a schematic structural diagram of an apparatus 1100 according to an embodiment of this application.

Based on a same inventive concept as that in the foregoing method embodiments, as shown in FIG. 11, an embodiment of this application further provides an apparatus. The apparatus may include a receiving module 1101 and a sending module 1102.

In a possible implementation, the apparatus implements functions of the terminal device in the foregoing method. The apparatus may be a terminal device, or may be an apparatus in a terminal device. The receiving module 1101 is configured to receive control information in a time unit n. The control information includes an activation command for a first secondary cell or a deactivation command for a first secondary cell. When the control information includes an activation command for the first secondary cell, the sending module 1102 is configured to send first information of the first secondary cell in a time unit n+k. Specifically, the receiving module 1101 and the sending module 1102 may perform corresponding functions performed by the terminal device in any one of the foregoing method embodiments. Details are not described herein again.

In a possible implementation, the apparatus implements functions of the network device in the foregoing method. The apparatus may be a network device, or may be an apparatus in a network device. The sending module 1102 is configured to send control information in a time unit n. The control information includes an activation command for a first secondary cell or a deactivation command for a first secondary cell. When the control information includes the activation command for the first secondary cell, the receiving module 1101 is configured to receive first information of the first secondary cell in a time unit n+k. Specifically, the receiving module 1101 and the sending module 1102 may perform corresponding functions performed by the network device in any one of the foregoing method embodiments. Details are not described herein again.

Module division in this embodiment of this application is an example, and is merely logical function division. In actual implementation, other division manners may be used. In addition, function modules in the embodiments of this application may be integrated into one processor, or may exist alone physically, or two or more modules may be integrated into one module. The integrated module may be implemented in a form of hardware, or may be implemented in a form of a software functional module.

Figure 12:
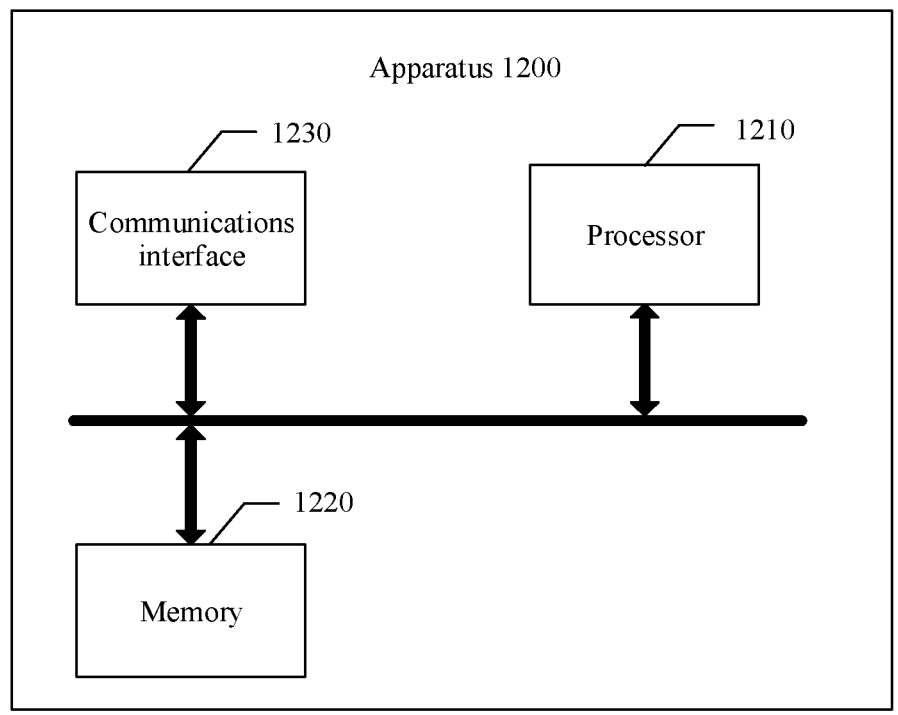
FIG. 12 is a schematic structural diagram of an apparatus 1200 according to an embodiment of this application.

Based on a same concept, FIG. 12 shows an apparatus 1200 according to this application. The apparatus 1200 includes at least one processor 1210, for example, performing the method in the foregoing embodiment. The apparatus may further include at least one memory 1220, configured to store a program instruction and/or data. The memory 1220 is coupled to the processor 1210. The coupling in the embodiments of this application is an indirect coupling or communication connection between apparatuses, units, or modules, may be electrical, mechanical, or in another form, and is used for information exchange between the apparatuses, the units, or the modules. The processor 1210 may operate in coordination with the memory 1220. The processor 1210 may execute the program instruction stored in the memory 1220, to be invoked by the processor 1210, to implement a function of the processor 1210. Optionally, at least one of the at least one memory 1220 may be included in the processor 1210. The apparatus 1200 may further include a communications interface 1230. The apparatus 1200 may exchange information with another device through the communications interface 1230. The communications interface 1230 may be a circuit, a bus, a transceiver, or any other apparatus that may be configured to exchange information.

In a possible implementation, the apparatus 1200 is applied to a network device. Specifically, the apparatus 1200 may be a network device, or may be an apparatus that can support the network device in implementing functions of the network device in the method in any one of the foregoing embodiments. For example, at least one processor 1210 in the apparatus 1200 is configured to implement the functions of the network device in the method in any one of the foregoing embodiments.

In a possible implementation, the apparatus 1200 is applied to a terminal device. Specifically, the apparatus 1200 may be a terminal device, or may be an apparatus that can support the terminal device in implementing functions of the terminal device in the method in any one of the foregoing embodiments. For example, at least one processor 1210 in the apparatus 1200 is configured to implement the functions of the terminal device in the method in any one of the foregoing embodiments.

For example, the apparatus 1200 may be a chip or a chip system. Optionally, in this embodiment of this application, the chip system may include a chip, or may include a chip and another discrete device.

A specific connection medium between the communications interface 1230, the processor 1210, and the memory 1220 is not limited in this embodiment of this application. In this embodiment of this application, the memory 1220, the processor 1210, and the communications interface 1230 are connected by using a bus in FIG. 12. The bus is represented by a thick line in FIG. 12. A connection manner between other components is merely an example for description, and is not limited thereto. The bus may be classified into an address bus, a data bus, a control bus, and the like. For ease of representation, only one thick line is used to represent the bus in FIG. 12, but this does not mean that there is only one bus or only one type of bus.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor or any conventional processor, or the like. The steps in the methods disclosed with reference to the embodiments of this application may be directly performed by a hardware processor, or may be performed by using a combination of hardware and a software module in the processor.

In this embodiment of this application, the memory may be a nonvolatile memory, such as a hard disk drive (HDD) or a solid-state drive (SSD), or may be a volatile memory, such as a random access memory (RAM). The memory may further be any other medium that can be configured to carry or store expected program code in a form of an instruction or a data structure and that can be accessed by a computer, but is not limited thereto. The memory in this embodiment of this application may alternatively be a circuit or any other apparatus that can implement a storage function, and is configured to store a program instruction and/or data.

According to the methods provided in the embodiments of this application, an embodiment of this application further provides a communications system, including the network device and the terminal device described above.

Based on the foregoing embodiments, an embodiment of this application further provides a computer storage medium. The storage medium stores a software program, and when the software program is read and executed by one or more processors, the method provided in any one or more of the foregoing embodiments may be implemented. The computer storage medium may include: any medium that can store program code, such as a USB flash drive, a removable hard disk, a read-only memory, a random access memory, a magnetic disk, or an optical disc.

Based on the foregoing embodiments, an embodiment of this application further provides a chip. The chip includes a processor, configured to implement the functions in any one or more of the foregoing embodiments, for example, a function of obtaining or processing the information or the message in the foregoing methods. Optionally, the chip further includes a memory, and the memory is configured to store a necessary program instruction and necessary data that are executed by the processor. The chip may include a chip, or may include a chip and another discrete component.

All or some of the foregoing methods provided in the embodiments of this application may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, a network device, a user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

Clearly, a person skilled in the art can make various modifications and variations to this application without departing from the scope of this application. This application is intended to cover these modifications and variations of this application provided that they fall within the scope of the claims and their equivalent technologies.

What is claimed is:

1. An apparatus comprising:
a memory configured to store a program instruction; and
a processor that is configured to invoke and execute the program instruction stored in the memory to:
receive control information in a time unit n, wherein the control information comprises an activation command for a first secondary cell; and
send first information of the first secondary cell in a time unit n+k, wherein k is determined based on a first frame structure parameter configured for a terminal device, the first frame structure parameter corresponds to a value of an activated BandWidth Part (BWP) in the first secondary cell as measured in units of slots, and both n and k are positive integers.

2. The apparatus according to claim 1, wherein the first frame structure parameter comprises at least one of a sub-carrier spacing and a cyclic prefix.

3. The apparatus according to claim 1, wherein the processor is further configured to:
determine k based on a processing time determined based on at least one of the following:
a processing time of the terminal device for a physical downlink shared channel (PDSCH), wherein the processing time of the terminal device for the PDSCH is determined based on the first frame structure parameter;
a downlink data HARQ feedback time configured for the terminal device, wherein the downlink data HARQ feedback time is determined based on the first frame structure parameter;
a preparation time of the terminal device for a channel state information (CSI) report, wherein the preparation time of the terminal device for the CSI report is determined based on the first frame structure parameter;
a preparation time of the terminal device for a physical uplink shared channel (PUSCH), wherein the preparation time of the terminal device for the PUSCH is determined based on the first frame structure parameter;
a CSI calculation time of the terminal device, wherein the CSI calculation time of the terminal device is determined based on the first frame structure parameter; and an uplink data scheduling time configured for the terminal device, wherein the uplink data scheduling time is determined based on the first frame structure parameter.

4. The apparatus according to claim 3, wherein the processor is further configured to determine the downlink data HARQ feedback time based on the first frame structure parameter and a feedback time indicator field in downlink control information (DCI).

5. The apparatus according to claim 3, wherein the processor is further configured to:
determine the processing time based on at least one of the following:
a processing time of a media access control (MAC) layer of the terminal device;
a radio frequency adjustment time of the terminal device;
a preparation time or an end time for the terminal device to perform baseband processing on the first secondary cell; and
a time difference for the terminal device to send signals in different cells.

6. The apparatus according to claim 1, wherein the time unit is a slot or a symbol.

7. The apparatus according to claim 6, wherein,
when the time unit is the slot, k meets the following condition:

$$k = ceil\left(N_{slot}^{subframe,\mu} \times \frac{T_{absolute\ time}}{T_{sf}}\right),$$

wherein $T_{absolute\ time}$ represents a value of the processing time measured in an absolute time, $N_{slot}^{subframe,\mu}$ represents a quantity of slots comprised in a subframe corresponding to the first frame structure parameter, ceil(x) returns a minimum integer greater than or equal to x, and $T_{sf}$ represents a duration of the subframe.

8. The apparatus according to claim 6, wherein
when the time unit is the symbol, k meets the following condition:
k=ceil($T_{absolute\ time}$÷$T_{symbol\ duration}$), wherein $T_{absolute\ time}$ represents a value of the processing time measured in an absolute time, ceil(x) returns a minimum integer greater than or equal to x, and $T_{symbol\ duration}$ represents a duration of a symbol corresponding to the first frame structure parameter.

9. The apparatus according to claim 1, wherein an index of the first frame structure parameter is:
a smaller value in a frame structure parameter index of the first secondary cell and a frame structure parameter index of a second secondary cell, wherein the control information further comprises an activation command or a deactivation command for the second secondary cell;
a smallest value in frame structure parameter indexes of a cell that are configured for the terminal device;
a smallest value in a frame structure parameter index of the first secondary cell, a frame structure parameter index of a second secondary cell, and a frame structure parameter index of a cell used to transmit the first information, wherein the control information further comprises the activation command or the deactivation command for the second secondary cell; or
a frame structure parameter with a smaller index value in a second frame structure parameter and a frame structure parameter that corresponds to a cell used to transmit the control information.

10. The apparatus according to claim 9, wherein,
when the control information comprises the activation command for the first secondary cell and does not comprise the activation command or the deactivation command for the second secondary cell, the second frame structure parameter is a frame structure parameter corresponding to the first secondary cell; and
when the control information further comprises the activation command or the deactivation command for the second secondary cell, the second frame structure parameter is a frame structure parameter with a smaller index value in the frame structure parameter corresponding to the first secondary cell and a frame structure parameter corresponding to the second secondary cell.

11. The apparatus according to claim 1, wherein the first information comprises a CSI report.

12. The apparatus according to claim 1, wherein the first frame structure parameter comprises an uplink frame structure parameter.

13. A method, comprising:
sending control information in a time unit n, wherein the control information comprises an activation command for a first secondary cell;
receiving first information of the first secondary cell in a time unit n+k; and
determining k based on a first frame structure parameter configured for a terminal device, wherein the first frame structure parameter corresponds to a value of an activated BandWidth Part (BWP) in the first secondary cell as measured in units of slots and both n and k are positive integers.

14. The method according to claim 13, wherein the first frame structure parameter comprises at least one of a subcarrier spacing and a cyclic prefix.

15. The method according to claim 13, wherein determining k based on the first frame structure parameter configured for the terminal device further comprises:
determining k based on a processing time and the processing time is determined based on at least one of the following:
a processing time of the terminal device for a physical downlink shared channel (PDSCH), wherein the processing time of the terminal device for the PDSCH is determined based on the first frame structure parameter;
a downlink data HARQ feedback time configured for the terminal device, wherein the downlink data HARQ feedback time is determined based on the first frame structure parameter;
a preparation time of the terminal device for a channel state information (CSI) report, wherein the preparation time of the terminal device for the CSI report is determined based on the first frame structure parameter;
a preparation time of the terminal device for a physical uplink shared channel (PUSCH), wherein the preparation time of the terminal device for the PUSCH is determined based on the first frame structure parameter;
a CSI calculation time of the terminal device, wherein the CSI calculation time of the terminal device is determined based on the first frame structure parameter; and
an uplink data scheduling time configured for the terminal device, wherein the uplink data scheduling time is determined based on the first frame structure parameter.

16. The method according to claim 15, wherein determining the downlink data HARQ feedback time based on the first frame structure parameter further comprises:
   determining the downlink data HARQ feedback time based on the first frame structure parameter and a feedback time indicator field in downlink control information (DCI).

17. An apparatus, comprising a processor and a memory, wherein the memory is configured to store a program instruction; and the processor is configured to invoke and execute the program instruction stored in the memory, to send control information in a time unit n, wherein the control information comprises an activation command for a first secondary cell;
   receive first information of the first secondary cell in a time unit n+k; and
   determine k based on a first frame structure parameter configured for a terminal device, wherein the first frame structure parameter corresponds to a value of an activated BandWidth Part (BWP) in the first secondary cell as measured in units of slots and both n and k are positive integers.

18. The apparatus according to claim 17, wherein the first frame structure parameter comprises at least one of a sub-carrier spacing and a cyclic prefix.

19. The apparatus according to claim 17, wherein determining k based on the first frame structure parameter configured for the terminal device further comprises:
   determining k based on a processing time and the processing time is determined based on at least one of the following:
   a processing time of the terminal device for a physical downlink shared channel (PDSCH), wherein the processing time of the terminal device for the PDSCH is determined based on the first frame structure parameter;
   a downlink data HARQ feedback time configured for the terminal device, wherein the downlink data HARQ feedback time is determined based on the first frame structure parameter;
   a preparation time of the terminal device for a channel state information (CSI) report, wherein the preparation time of the terminal device for the CSI report is determined based on the first frame structure parameter;
   a preparation time of the terminal device for a physical uplink shared channel (PUSCH), wherein the preparation time of the terminal device for the PUSCH is determined based on the first frame structure parameter;
   a CSI calculation time of the terminal device, wherein the CSI calculation time of the terminal device is determined based on the first frame structure parameter; and
   an uplink data scheduling time configured for the terminal device, wherein the uplink data scheduling time is determined based on the first frame structure parameter.

20. The apparatus according to claim 19, wherein determining the downlink data HARQ feedback time based on the first frame structure parameter further comprises:
   determining the downlink data HARQ feedback time based on the first frame structure parameter and a feedback time indicator field in downlink control information (DCI).

\* \* \* \* \*